(12) United States Patent
Meyer et al.

(10) Patent No.: US 11,088,527 B2
(45) Date of Patent: Aug. 10, 2021

(54) ARC FAULT IDENTIFICATION UNIT

(71) Applicant: Siemens Aktiengesellschaft, Munich (DE)

(72) Inventors: Joerg Meyer, Dresden (DE); Peter Schegner, Dresden (DE); Karsten Wenzlaff, Dresden (DE); Stefan Widmann, OT Lintach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 404 days.

(21) Appl. No.: 16/305,120

(22) PCT Filed: May 30, 2017

(86) PCT No.: PCT/EP2017/062980
§ 371 (c)(1),
(2) Date: Nov. 28, 2018

(87) PCT Pub. No.: WO2017/207535
PCT Pub. Date: Dec. 7, 2017

(65) Prior Publication Data
US 2019/0173271 A1    Jun. 6, 2019

(30) Foreign Application Priority Data

May 31, 2016 (DE) .................. 10 2016 209 443.2
May 31, 2016 (DE) .................. 10 2016 209 444.0
(Continued)

(51) Int. Cl.
*H02H 9/08* (2006.01)
*H02H 3/00* (2006.01)
(Continued)

(52) U.S. Cl.
CPC ............ *H02H 1/0015* (2013.01); *H02H 3/05* (2013.01); *H02H 3/38* (2013.01); *H02H 9/041* (2013.01)

(58) Field of Classification Search
CPC ............ H02H 9/041; H02H 3/05; H02H 3/08; H02H 1/0015
(Continued)

(56) References Cited

U.S. PATENT DOCUMENTS 4,780,789 A   10/1988  Kugler et al.
5,726,577 A    3/1998  Engel et al.
(Continued)

FOREIGN PATENT DOCUMENTS

CA        1210847 A      9/1986
CN      101395777 A      3/2009
(Continued)

OTHER PUBLICATIONS

Chinese Office Action and English translation thereof dated Jul. 18, 2019.
(Continued)

*Primary Examiner* — Jared Fureman
*Assistant Examiner* — Lucy M Thomas
(74) *Attorney, Agent, or Firm* — Harness, Dickey & Pierce, P.L.C.

(57) ABSTRACT

An arc fault identification unit for an electrical three-phase alternating current circuit with three phase conductors and a neutral conductor. The identification unit includes voltage sensors to periodically determine phase/neutral conductor voltage values and phase/phase voltage values current sensors to periodically determine phase conductor current variables which are used to determine the phase conductor current value and a value for the change in the electrical current over time per phase, and an evaluation unit con-
(Continued)

nected to the voltage and current sensors. A current root mean square is compared with a current threshold value in each case and an excess current signal is emitted if the threshold value is exceeded; arc voltages are calculated and are compared with threshold values, with the result that arc fault identification signals are output.

21 Claims, 5 Drawing Sheets

(30) Foreign Application Priority Data

| May 31, 2016 | (DE) | 10 2016 209 445.9 |
|---|---|---|
| May 31, 2016 | (WO) | PCT/EP2016/062271 |
| May 31, 2016 | (WO) | PCT/EP2016/062272 |
| May 31, 2016 | (WO) | PCT/EP2016/062273 |
| May 31, 2016 | (WO) | PCT/EP2016/062274 |

(51) Int. Cl.
| H02H 1/00 | (2006.01) |
|---|---|
| H02H 3/38 | (2006.01) |
| H02H 3/05 | (2006.01) |
| H02H 9/04 | (2006.01) |

(58) Field of Classification Search
USPC .......................................................... 361/42
See application file for complete search history.

(56) References Cited

U.S. PATENT DOCUMENTS

| 6,654,219 | B1 | 11/2003 | Romano et al. |
|---|---|---|---|
| 6,987,389 | B1 | 1/2006 | Macbeth et al. |
| 7,268,989 | B2 | 9/2007 | Parker et al. |
| 2005/0017731 | A1 | 1/2005 | Zuercher et al. |
| 2006/0012931 | A1 | 1/2006 | Engel et al. |
| 2006/0227469 | A1 | 10/2006 | Parker et al. |
| 2007/0086124 | A1 | 4/2007 | Elms et al. |
| 2007/0208520 | A1 | 9/2007 | Zhang et al. |
| 2008/0106832 | A1 | 5/2008 | Restrepo et al. |
| 2008/0129307 | A1 | 6/2008 | Yu et al. |
| 2009/0040665 | A1 | 2/2009 | Elms et al. |
| 2011/0019444 | A1 | 1/2011 | Dargatz et al. |
| 2011/0128005 | A1* | 6/2011 | Weiher ............... H02H 3/044 324/424 |
| 2012/0056637 | A1 | 3/2012 | Jeong et al. |
| 2012/0134058 | A1 | 5/2012 | Pamer et al. |
| 2013/0169290 | A1 | 7/2013 | Shea |
| 2014/0071575 | A1 | 3/2014 | Parker et al. |
| 2014/0160603 | A1 | 6/2014 | Parker |
| 2014/0247066 | A1 | 9/2014 | Chaintreuil et al. |
| 2016/0111870 | A1 | 4/2016 | Murano et al. |
| 2016/0187410 | A1* | 6/2016 | Kolker ............... G01R 31/1272 361/42 |
| 2016/0241017 | A1 | 8/2016 | Schroeder et al. |

FOREIGN PATENT DOCUMENTS

| CN | 101523681 A | 9/2009 |
|---|---|---|
| CN | 101573847 A | 11/2009 |
| CN | 101696986 A | 4/2010 |
| CN | 102401869 | 4/2012 |
| CN | 102565578 A | 7/2012 |
| CN | 102916415 A | 2/2013 |
| CN | 103635820 A | 3/2014 |
| CN | 103645396 A | 3/2014 |
| CN | 203774769 U | 8/2014 |
| CN | 104620349 A | 5/2015 |
| CN | 204462364 U | 7/2015 |
| CN | 104898008 A | 9/2015 |
| CN | 105445587 A | 3/2016 |
| DE | 102013001612 A1 | 8/2013 |
| EP | 0509652 A2 | 10/1992 |
| EP | 0802602 A2 | 10/1997 |
| EP | 2426802 A2 | 3/2012 |
| EP | 2916455 A1 | 9/2015 |
| GB | 2510871 A | 8/2014 |
| TW | 217471 B | 12/1993 |
| WO | WO-2008146040 A1 | 12/2008 |
| WO | WO-2009008871 A1 | 1/2009 |
| WO | WO-2009/156513 A1 | 12/2009 |

OTHER PUBLICATIONS

U.S. Office Action for copending U.S. Appl. No. 16/305,102 dated Dec. 21, 2020.
International Search Report PCT/ISA/210 for International Application No. PCT/EP2016/062271 dated May 31, 2016.
International Search Report PCT/ISA/210 for International Application No. PCT/EP2016/062272 dated May 31, 2016.
International Search Report PCT/ISA/210 for International Application No. PCT/EP2016/062274 dated May 31, 2016.
International Search Report PCT/ISA/210 for International Application No. PCT/EP2016/062273 dated May 31, 2016.
U.S. Appl. No. 16/305,131, filed Nov. 28, 2018.
U.S. Appl. No. 16/305,102, filed Nov. 28, 2018.
U.S. Appl. No. 16/305,132, filed Nov. 28, 2018.
U.S. Appl. No. 16/305,109, filed Nov. 28, 2018.
Chinese Office Action and English translation thereof dated Jul. 2, 2019.
Chinese Office Action and English translation thereof for Chinese Application No. 2016800877078 dated Sep. 2, 2019.
International Search Report PCT/ISA/210 for International Application No. PCT/EP2016/062271 dated May 31, 2016.
U.S. Notice of Allowance for corresponding U.S. Appl. No. 16/305,102 dated Mar. 3, 2021.
U.S. Notice of Allowance for corresponding U.S. Appl. No. 16/305,109 dated Mar. 25, 2021.
Chinese Office Action and English translation thereof for Chinese Application No. 2017800461033 dated Jul. 25, 2019.
Chinese Office Action and English translation thereof for Chinese Application No. 2016800879980 dated Jul. 18, 2019.
PCT International Search Report and Written Opinion of International Searching Authority dated Dec. 9, 2017 corresponding to PCT International Application No. PCT/EP2017/062980 filed May 30, 2017.
U.S. Office Action for corresponding U.S. Appl. No. 16/305,131 dated Apr. 19, 2021.
U.S. Office Action for corresponding U.S. Appl. No. 16/305,132 dated Jun. 8, 2021.

\* cited by examiner

ARC FAULT IDENTIFICATION UNIT

PRIORITY STATEMENT

This application is the national phase under 35 U.S.C. § 371 of PCT International Application No. PCT/EP2017/062980 which has an International filing date of May 30, 2017, which designated the United States of America and which claims priority to each of the following:

PCT International Application No. PCT/EP2016/062274 filed May 31, 2016;

PCT International Application No. PCT/EP2016/062273 filed May 31, 2016;

PCT International Application No. PCT/EP2016/062272 filed May 31, 2016;

German Patent Application No. 10 2016 209 445.9 filed May 31, 2016;

German Patent Application No. 10 2016 209 444.0 filed May 31, 2016;

German Patent Application No. 10 2016 209 443.2 filed May 31, 2016; and

PCT International Application No. PCT/EP2016/062271 filed May 31, 2016, the entire contents of each of which are hereby incorporated herein by reference.

The present patent application claims the priorities of the following applications:
PCT/EP2016/062274
PCT/EP2016/062273
PCT/EP2016/062272
PCT/EP2016/062271
(European patent office) and:
102016209444.0
102016209443.2
102016209445.9
(German patent office). The content of the 7 applications mentioned above is hereby incorporated by reference in this application.

FIELD

Embodiments of the invention generally relates to an arc fault identification unit, a circuit breaker, a short-circuiter and a method for arc fault identification.

BACKGROUND

In low-voltage circuits or low-voltage installations or low-voltage networks, respectively, i.e. circuits for voltages of up to 1000 volts AC voltage or 1500 volts DC voltage, short circuits are usually associated with arc faults that occur, such as parallel or serial arc faults. Low voltage is taken to mean, in particular, voltages that are greater than the extra-low voltage, having values of 25 volts or 50 volts AC voltage and 60 volts or 120 volts DC voltage.

Particularly in high-power distribution and switchgear installations, the arc faults, if not switched off fast enough, can lead to catastrophic destruction of operating equipment, installation parts or complete switchgear installations. In order to avoid a relatively lengthy and extensive power supply outage and to reduce injuries to persons and damage in general, it is necessary to identify and quench such arc faults, in particular arc faults of high current intensity or parallel arc faults, in a few milliseconds. Conventional protective systems of power supply installations (e.g. fuses and circuit breakers) cannot offer reliable protection under the temporal requirements demanded.

Switching arcs such as occur during electrical switching, in particular at the contacts, are not meant.

Arc faults are taken to mean arcs such as occur in the event of electrical faults in the circuit or in the installation. By way of example, they may be caused by short circuits or poor connections.

If a current flows in an "almost interrupted" phase conductor, a so-called serial arc fault arises at the interruption site.

If an (almost) short circuit with another phase conductor occurs, this is referred to as a parallel arc fault.

Parallel arc faults may be caused e.g. by aging of the insulation material or the presence of conductive contamination between phase conductors. They may occur between two different phase conductors, between phase conductor (L) and ground conductor (PE), or between phase conductor and neutral conductor (N).

If an arc constitutes the properties of a parallel and of a serial arc fault, this is referred to as a combined arc fault. When mention is made of phase, ground and neutral conductor, respectively, that refers not only to the conductors, but also to all installation parts at the same potential as the phase, ground and neutral conductors, respectively.

Generally, arc faults produce a faulty connection between the conductors or installation parts at different potentials.

Circuit breakers are taken to mean here, in particular, switches for low voltage. Circuit breakers, in particular in low-voltage installations, are usually used for currents of 63 to 6300 amperes. More specifically, closed circuit breakers, such as molded case circuit breakers, are used for currents of 63 to 1600 amperes, in particular of 125 to 630 or 1200 amperes. Open circuit breakers or air circuit breakers are used in particular for currents of 630 to 6300 amperes, more specifically of 1200 to 6300 amperes.

Switch-off currents are taken to mean the current at which the electrical circuit is usually interrupted, for example by a protective device, such as a circuit breaker.

Circuit breakers within the meaning of embodiments of the invention can comprise, in particular, a control unit or electronic trip unit, also referred to as ETU for short.

Circuit breakers are protective devices which function in a manner similar to a fuse. Circuit breakers monitor the current flowing through them and interrupt the electrical current or energy flow to an energy sink or a load, which is referred to as tripping, if current limit values or current/time period limit values, i.e. if a current value is present for a certain time period, are exceeded. The determination of trip conditions and the tripping of a circuit breaker can be carried out via a control unit/electronic trip unit (ETU). The control unit monitors the level of the electrical current measured by sensors, such as Rogowski coils, or in addition analogously the level of the voltage or/and of other parameters of the electrical circuit and brings about an interruption of the electrical circuit.

Short-circuiters are specific devices for short-circuiting lines or busbars in order to produce defined short circuits for protecting circuits or installations.

Conventional arc fault detection systems evaluate the light emission generated by the arc and thereby detect the arc fault.

SUMMARY

The inventors have recognized that the conventional fault arc detection systems have a disadvantage wherein optical waveguides or optical detection systems have to be laid parallel to the electrical lines or busbars in order to identify arc faults that possibly occur.

At least one embodiment of the present invention specifies a possibility for arc fault identification, in particular to achieve a fast identification of arc faults.

Embodiments of the present invention are directed to an arc fault identification unit, a circuit breaker, a short-circuiter and a method.

At least one embodiment of the invention provides for an arc fault identification unit for an electrical three-phase alternating current circuit having three phase conductors and a neutral conductor, comprising:

voltage sensors assigned to each phase conductor, for periodically determining phase-neutral conductor voltage values ($u_{L1}$, $u_{L2}$, $u_{L3}$) and phase-phase voltage values ($u_{L1-L2}$, $u_{L2-L3}$, $u_{L3-L1}$)

current sensors assigned to each phase conductor, for periodically determining phase conductor current variables used to determine the phase conductor current value ($i_{L1}$, $i_{L2}$, $i_{L3}$) and a value for the change in the electrical current with respect to time ($di_{L1}/dt$, $di_{L2}/dt$, $di_{L3}/dt$), an evaluation unit, which is connected to the voltage and current sensors and is configured in such a way that:

from the phase conductor current values ($i_{L1}$, $i_{L2}$, $i_{L3}$) in each case the current differences of two phase conductors are determined as concatenated currents ($i_{L1-L2}$, $i_{L2-L3}$, $i_{L3-L1}$) and from the values for the change in the electrical current with respect to time per phase in each case the change differences of two phase conductors are determined as concatenated change current values, a ground current (ig(v)) is determined from the phase conductor current values ($i_{L1}$, $i_{L2}$, $i_{L3}$), a respective current root-mean-square value (I(v)) is determined for each phase current value ($i_{L1}$, $i_{L2}$, $i_{L3}$) and the ground current (ig(v)), the respective current root-mean-square value is compared in each case with a first, second, third and fourth current threshold value (SSW1, SSW2, SSW3, SSW4) and a first, second, third or fourth overcurrent signal ($F_{L1}$, $F_{L2}$, $F_{L3}$, $F_E$) is output respectively upon the current threshold value being exceeded, from the phase-neutral conductor voltage values ($u_{L1}$, $u_{L2}$, $u_{L3}$), phase-phase voltage values ($u_{L1-L2}$, $u_{L2-L3}$, $u_{L3-L1}$), phase current values ($i_{L1}$, $i_{L2}$, $i_{L3}$), concatenated currents ($i_{L1-L2}$, $i_{L2-L3}$, $i_{L3-L1}$), values for the change in the electrical current with respect to time ($di_{L1}/dt$, $di_{L2}/dt$, $di_{L3}/dt$) and concatenated change current values per phase-neutral conductor and per phase-phase in each case a first, second, third, fourth, fifth and sixth arc voltage is calculated, which is compared with first to sixth threshold values, such that a first to sixth arc fault identification signal is output, from the phase-neutral conductor voltage values ($u_{L1}$, $u_{L2}$, $u_{L3}$) and phase-phase voltage values ($u_{L1-L2}$, $u_{L2-L3}$, $u_{L3-L1}$) in each case a seventh to twelfth arc voltage is calculated, which is compared with seventh to twelfth threshold values, such that a seventh to twelfth arc fault identification signal is output, an output-side arc fault identification signal is output if at least one overcurrent signal and one arc fault identification signal are present.

At least one embodiment of the invention provides for an arc fault identification unit for an electrical three-phase alternating current circuit having three phase conductors and a neutral conductor, comprising:

voltage sensors, each of the respective voltage sensors being assigned to each of a respective phase conductor of the three phase conductors, to periodically determine phase-neutral conductor voltage values and phase-phase voltage values;

current sensors, each of the respective current sensors being assigned to each of a respective phase conductor of the three phase conductors, to periodically determine phase conductor current variables usable to determine phase conductor current values and a value for a change in electrical current with respect to time; and an evaluation unit, connected to the voltage and connected to the current sensors, and configured to, from the phase conductor current values periodically determined from periodically determined phase conductor current variables, determine current differences of two phase conductors as concatenated currents and configured to, from values for a change in the electrical current with respect to time per phase, determine change differences of two phase conductors as concatenated change current values, the evaluation unit being further configured to:
  determine a ground current from the phase conductor current values,
  determine a respective current root-mean-square value for each of the phase conductor current values and for a ground current,
  to compare the respective current root-mean-square value, for each of the phase conductor current values and for a ground current, with a first, second, third and fourth current threshold value,
  to respectively output a first, second, third or fourth overcurrent signal upon the comparing indicating that a respective first, second, third or fourth current threshold value is exceeded,
  to calculate a first arc voltage from the phase-neutral conductor voltage values,
  to calculate a second arc voltage from the phase-phase voltage values,
  to calculate a third arc voltage from the phase current values,
  to calculate a fourth arc voltage from the concatenated currents,
  to calculate a fifth arc voltage from values for a change in electrical current with respect to time,
  to calculate a sixth arc voltage from the concatenated change current values per phase-neutral conductor and per phase-phase
  to respectively compare the first arc voltage, second arc voltage, third arc voltage, fourth arc voltage, fifth arc voltage and sixth arc voltage to a sixth threshold value, and to respectively output a first to sixth arc fault identification signal based upon the respective comparisons,
  to respectively calculate a seventh arc voltage, an eighth arc voltage, a ninth arc voltage, a tenth arc voltage, an eleventh arc voltage, and a twelfth arc voltage from the phase-neutral conductor voltage values and phase-phase voltage values,
  to respectively compare the seventh to twelfth arc voltages to seventh to twelfth threshold values, such that a respective seventh to twelfth arc fault identification signal is output upon a respective one of the seventh to twelfth arc voltages exceeding a respective one of the seventh to twelfth threshold values, and to output an output-side arc fault identification signal upon at least one overcurrent signal and one arc fault identification signal being present.

An embodiment of the invention furthermore provides a circuit breaker for an electrical circuit, in particular low-voltage circuit. The circuit breaker comprises an arc fault identification unit according to the invention. The latter is connected to the circuit breaker, wherein these are configured in such a way that when an arc fault identification signal is output, the circuit breaker trips, i.e. interrupts the electrical circuit. Quenching of the arc fault can thus be achieved. If the circuit breaker comprises an electronic trip unit, it is possible to achieve very fast tripping of the circuit breaker when an arc fault identification signal is present.

An embodiment of the invention furthermore provides a short-circuiter, comprising an arc fault identification unit connected to the short-circuiter. These are configured in such a way that when an arc fault identification signal is output, the short-circuiter short-circuits the electrical circuit in order to cause the arc fault to be quenched.

An embodiment of the invention furthermore provides a method for arc fault identification for an electrical circuit.

An embodiment of the invention furthermore provides a method for arc fault identification for an electrical three-phase alternating current circuit including three phase conductors and a neutral conductor, comprising:
periodically determining electrical voltage values and current variables per phase conductor, including:
  periodically determining phase-neutral conductor voltage values and phase-phase voltage values,
  periodically determining phase conductor current values and values for a change in electrical current with respect to time per phase,
  periodically determining, from respective phase conductor current values, respective current differences of two phase conductors as concatenated currents and periodically determining, from respective values for the change in the electrical current with respect to time per phase, respective change differences of two phase conductors as concatenated change current values,
determining a ground current from the phase conductor current values,
determining respective current root-mean-square values for each respective phase current value and the ground current,
comparing respective current root-mean-square values to one of a respective first current threshold value, second current threshold value, third current threshold value and fourth current threshold value,
outputting a respective first overcurrent signal, second overcurrent signal, third overcurrent signal or fourth overcurrent signal upon a respective one of the first current threshold value, the second current threshold value, the third current threshold value and the fourth current threshold value current threshold value being exceeded,
calculating, from a respective one of the phase-neutral conductor voltage values, phase-phase voltage values, phase conductor current values, concatenated currents, values for the change in the electrical current with respect to time and concatenated change current values per phase-neutral conductor and per phase-phase, a respective one of a first arc voltage, a second arc voltage, a third arc voltage, a fourth arc voltage, a fifth arc voltage and a sixth arc voltage,
comparing the respective first arc voltage, a second arc voltage, a third arc voltage, a fourth arc voltage, a fifth arc voltage and a sixth arc voltage to the respective first threshold value, second threshold value, third threshold value, fourth threshold value, fifth threshold value and sixth threshold value, to output a respective first to sixth arc fault identification signal upon a respective threshold value being exceeded,
calculating, from respective phase-neutral conductor voltage values and phase-phase voltage values, a respective seventh to twelfth arc voltage, and
comparing the respective seventh to twelfth arc voltage to respective seventh to twelfth threshold values, to output a respective seventh to twelfth arc fault identification signal upon a respective threshold value being exceeded, wherein an output-side arc fault identification signal is output upon at least one overcurrent signal and one arc fault identification signal being present.

BRIEF DESCRIPTION OF THE DRAWINGS

The described properties, features and advantages of this invention and the way in which they are achieved will become clearer and more clearly understood in association with the following description of the example embodiments which are explained in greater detail in association with the drawings.

Here in the Figures.

DETAILED DESCRIPTION OF THE EXAMPLE EMBODIMENTS

Figure 1:
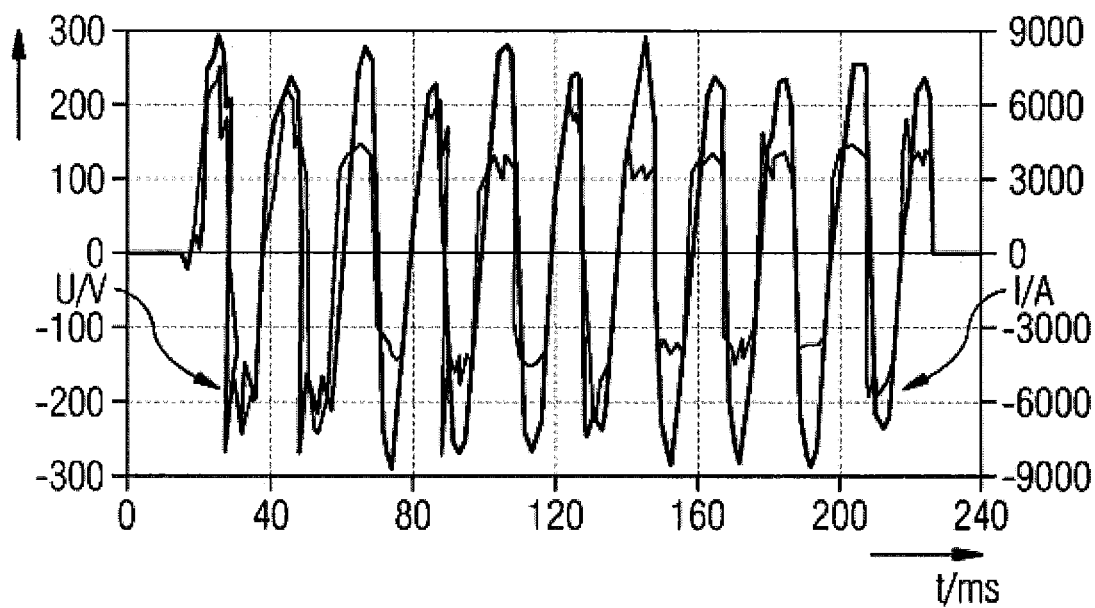
FIG. 1 shows a diagram of the voltage and current time profiles after arc ignition.

At least one embodiment of the invention provides for an arc fault identification unit for an electrical three-phase alternating current circuit having three phase conductors and a neutral conductor to comprise:
voltage sensors assigned to each phase conductor, for periodically determining phase-neutral conductor voltage values ($u_{L1}$, $u_{L2}$, $u_{L3}$) and phase-phase voltage values ($u_{L1-L2}$, $u_{L2-L3}$, $u_{L3-L1}$), wherein here for example three voltage sensors can respectively be provided, wherein a respective voltage sensor is provided between a phase conductor and the neutral conductor, such that the phase-neutral conductor voltage values are determined directly, and the phase-phase voltage values by calculation; alternatively, a voltage sensor can also be provided for the phase-phase voltage values; by way of example, the voltages are determined by:

Calculation of the Concatenated Voltages:

$$u_{L1-L2}(v) = u_{L1}(v) - u_{L2}(v)$$

$$u_{L2-L3}(v) = u_{L2}(v) - u_{L3}(v)$$

$$u_{L3-L1}(v) = u_{L3}(v) - u_{L1}(v)$$

current sensors assigned to each phase conductor, for periodically determining phase conductor current variables used to determine the phase conductor current value ($i_{L1}$, $i_{L2}$, $i_{L3}$) and a value for the change in the electrical current with respect to time ($di_{L1}/dt$, $di_{L2}/dt$, $di_{L3}/dt$), here for example it is possible to determine the current value directly and therefrom the change in the current with respect to time, for example via a conventional current sensor; alternatively, it is also possible for the change in the current with respect to time to be determined, e.g. via a Rogowski coil, and for the current to be determined therefrom by integration;

an evaluation unit, which is connected to the voltage and current sensors and is configured in such a way that:

from the phase conductor current values in each case the current differences of two phase conductors are determined as concatenated currents and from the values for the change in the electrical current with respect to time per phase in each case the change differences of two phases conductors are determined as concatenated change current values, for example by:

Calculation of the Concatenated Currents:

$$i_{L1-L2}(v) = i_{L1}(v) - i_{L2}(v)$$

$$i_{L2-L3}(v) = i_{L2}(v) - i_{L3}(v)$$

$$i_{L3-L1}(v) = i_{L3}(v) - i_{L1}(v)$$

Calculation of the current differential, i.e. the change in the electrical current with respect to time, from the currents: $i_{L1}, i_{L2}, i_{L3}, i_{L1-L2}, i_{L2-L3}, i_{L3-L1}, i_E$ For example by:

$$\frac{di}{dt}\bigg|_{v-1} = f_A\left(\frac{i_v - i_{v-2}}{2}\right)$$

a ground current ($i_E(v)$) is determined from the phase conductor current values ($i_{L1}$, $i_{L2}$, $i_{L3}$); in particular, the ground current is the sum of the conductor currents:

$$i_E(v) = i_{L1}(v) + i_{L2}(v) + i_{L3}(v)$$

a respective current root-mean-square value ($I(v)$) is determined for each phase current value ($i_{L1}$, $i_{L2}$, $i_{L3}$) and the ground current ($i_E(v)$); in particular, the current root-mean-square value can be calculated as follows:

$$I(v) = \sqrt{\frac{1}{2}\left[i(v)^2 + \left(\frac{1}{\omega}\cdot\frac{di}{dt}\bigg|_v\right)^2\right]}$$

$\omega = 2\cdot\pi\cdot f_{grid}$; $f_{grid} = 50$ Hz (as an example of a 50 hertz grid, alternatively: 60 hertz for UL grids)

Result of the calculation: $I_{L1}, I_{L2}, I_{L3}, I_E$ the respective current root-mean-square value is compared in each case with a first, second, third and fourth current threshold value (SSW1, SSW2, SSW3, SSW4) and a first, second, third or fourth overcurrent signal ($F_{L1}$, $F_{L2}$, $F_{L3}$, $F_E$) is output respectively upon the current threshold value being exceeded, in particular:

Threshold value comparison for the currents: $I_{L1}, I_{L2}, I_{L3}, I_E$ $$F(v) = \begin{cases} 0 & \text{for } I(v) < I_{free}^{LB} \\ 1 & \text{for } I(v) \geq I_{free}^{LB} \end{cases}$$

Result: $F_{L1}, F_{L2}, F_{L3}, F_E$ as first, second, third and fourth overcurrent signals.

| Setting value | Setting range | Rec. setting |
| --- | --- | --- |
| Threshold value $I_{free, L1}^{LB}$ | 0 ... 100000 A | 1000 A |
| Threshold value $I_{free, L2}^{LB}$ | 0 ... 100000 A | 1000 A |
| Threshold value $I_{free, L3}^{LB}$ | 0 ... 100000 A | 1000 A |
| Threshold value $I_{free, E}^{LB}$ | 0 ... 100000 A | 1000 A | from the phase-neutral conductor voltage values ($u_{L1}$, $u_{L2}$, $u_{L3}$), phase-phase voltage values ($u_{L1-L2}$, $u_{L2-L3}$, $u_{L3-L1}$), phase conductor current values ($i_{L1}$, $i_{L2}$, $i_{L3}$), concatenated currents ($i_{L1-L2}$, $i_{L2-L3}$, $i_{L3-L1}$), values for the change in the electrical current with respect to time ($di_{L1}/dt$, $di_{L2}/dt$, $di_{L3}/dt$) and concatenated change current values per phase-neutral conductor and per phase-phase, in each case a first, second, third, fourth, fifth and sixth arc voltage is calculated, which is compared with first to sixth threshold values, such that a first to sixth arc fault identification signal is output, in particular by way of at least one of the following (I.-V.) (sub)steps:

I.) Calculation of the Signum Function of the Currents:

$i_{L1}, i_{L2}, i_{L3}, i_{L1-L2}, i_{L2-L3}, i_{L3-L1}$ $$s(v) = \begin{cases} 0 & \text{for } |u_m(v)| \leq U_{I-RLs}^s \\ \text{sgn}(i(v)) & \text{for } |u_m(v)| > U_{I-RLs}^s \end{cases}$$

Result: $s_{L1}, s_{L2}, s_{L3}, s_{L1-L2}, s_{L2-L3}, s_{L3-L1}$

| | Setting range | Value |
| --- | --- | --- |
| Threshold value $U_{I-RLs}^s$ | 0 ... 1000 V | 12 V |

II.) Numerical Integration for Three Integration Ranges

1. Numerical Integration of the Voltages $u_{L1}, u_{L2}, u_{L3}, u_{L1-L2}, u_{L2-L3}, u_{L3-L1}$ $$u_s = \frac{\Delta t}{2}\left[u_m(v_A) + 2\sum_{k=v_A+1}^{v_E-1} u_m(k) + u_m(v_E)\right];$$

$$\Delta t = \frac{1}{f_A} = \frac{1}{50\text{ kHz}} = 20\text{ μs}$$

$$u_s = \Delta t\left[\sum_{k=v_A}^{v_E} u_m(k)\right];$$

This is a second calculation method. Ideally, the same calculation method can be used for all integrations.

Result for 1st integration range:

$u_{s1,L1}, u_{s1,L2}, u_{s1,L3}, u_{s1,L1-L2}, u_{s1,L2-L3}, u_{s1,L3-L1}$

Result for 2nd integration range:
$u_{s2,L1}, u_{s2,L2}, u_{s2,L3}, u_{s2,L1-L2}, u_{s2,L2-L3}, u_{s2,L3-L1}$
Result for 3rd integration range:
$u_{s3,L1}, u_{s3,L2}, u_{s3,L3}, u_{s3,L1-L2}, u_{s3,L2-L3}, u_{s3,L3-L1}$ 2. Numerical Integration of the Currents $i_{L1}, i_{L2}, i_{L3}, i_{L1-L2}, i_{L2-L3}, i_{L3-L1}$ $$i_s = \frac{\Delta t}{2}\left[i_m(v_A) + 2\sum_{k=v_A+1}^{v_E-1} i_m(k) + i_m(v_E)\right];$$

$$\Delta t = \frac{1}{f_A} = \frac{1}{50 \text{ kHz}} = 20 \text{ μs}$$

$$i_s = \Delta t \left[\sum_{k=v_A}^{v_E} i_m(k)\right];$$

Result for 1st integration range:
$i_{s1,L1}, i_{s1,L2}, i_{s1,L3}, i_{s1,L1-L2}, i_{s1,L2-L3}, i_{s1,L3-L1}$
Result for 2nd integration range:
$i_{s2,L1}, i_{s2,L2}, i_{s2,L3}, i_{s2,L1-L2}, i_{s2,L2-L3}, i_{s2,L3-L1}$
Result for 3rd integration range:
$i_{s3,L1}, i_{s3,L2}, i_{s3,L3}, i_{s3,L1-L2}, i_{s3,L2-L3}, i_{s3,L3-L1}$ 3. Numerical Integration of the Current Changes $\frac{di_{L1}}{dt}, \frac{di_{L2}}{dt}, \frac{di_{L3}}{dt}, \frac{di_{L1-L2}}{dt}, \frac{di_{L2-L3}}{dt}, \frac{di_{L3-L1}}{dt}$ $$i'_s = \frac{\Delta t}{2}\left[\frac{di_m}{dt}(v_A) + 2\sum_{k=v_A+1}^{v_E-1} \frac{di_m}{dt}(k) + \frac{di_m}{dt}(v_E)\right];$$

$$\Delta t = \frac{1}{f_A} = \frac{1}{50 \text{ kHz}} = 20 \text{ μs}$$

$$i'_s = \Delta t \left[\sum_{k=v_A}^{v_E} \frac{di_m}{dt}(k)\right];$$

Result for 1st integration range:
$i_{s1,L1}, i_{s1,L2}, i_{s1,L3}, i_{s1,L1-L2}, i_{s1,L2-L3}, i_{s1,L3-L1}$
Result for 2nd integration range:
$i_{s2,L1}, i_{s2,L2}, i_{s2,L3}, i_{s2,L1-L2}, i_{s2,L2-L3}, i_{s2,L3-L1}$
Result for 3rd integration range:
$i_{s3,L1}, i_{s3,L2}, i_{s3,L3}, i_{s3,L1-L2}, i_{s3,L2-L3}, i_{s3,L3-L1}$ 4. Numerical Integration of the Signum $s_{L1}, s_{L2}, s_{L3}, s_{L1-L2}, s_{L2-L3}, s_{L3-L1}$ $$s_s = \frac{\Delta t}{2}\left[s(v_A) + 2\sum_{k=v_A+1}^{v_E-1} s(k) + s(v_E)\right]; \Delta t = \frac{1}{f_A} = \frac{1}{50 \text{ kHz}} = 20 \text{ μs}$$

$$s_s = \Delta t \left[\sum_{k=v_A}^{v_E} s(k)\right];$$

Result for 1st integration range:
$s_{s1,L1}, s_{s1,L2}, s_{s1,L3}, s_{s1,L1-L2}, s_{s1,L2-L3}, s_{s1,L3-L1}$
Result for 2nd integration range:
$s_{s2,L1}, s_{s2,L2}, s_{s2,L3}, s_{s2,L1-L2}, s_{s2,L2-L3}, s_{s2,L3-L1}$
Result for 3rd integration range:
$s_{s3,L1}, s_{s3,L2}, s_{s3,L3}, s_{s3,L1-L2}, s_{s3,L2-L3}, s_{s3,L3-L1}$ Setting values for the definition of the integration intervals:

| Setting value | Setting range | Rec. setting |
|---|---|---|
| vA1 | −1000 . . . 0 | −150 |
| vE1 | −1000 . . . 0 | −101 |
| vA2 | −1000 . . . 0 | −100 |
| vE2 | −1000 . . . 0 | −51 |
| vA3 | −1000 . . . 0 | −50 |
| vE3 | −1000 . . . 0 | −1 |

III.) Solving the I-RLs Algorithm (Calculation of the Arc Voltage)

$$U_{LB} = \begin{cases} 0 \text{ V} & \text{for } s_{s1} \wedge s_{s2} \wedge s_{s3} = 0 \\ U_{LB'} & \text{for } s_{s1} \vee s_{s2} \vee s_{s3} \neq 0 \end{cases}$$

$$U_{LB*} = \frac{(u_{s3}i_{s2} - u_{s2}i_{s3})(i'_{s2}i_{s1} - i'_{s1}i_{s2}) - (u_{s2}i_{s1} - u_{s1}i_{s2})(i'_{s3}i_{s2} - i'_{s2}i_{s3})}{(s_{s1}i_{s2} - s_{s2}i_{s1})(i'_{s3}i_{s2} - i'_{s2}i_{s3}) - (s_{s2}i_{s3} - s_{s3}i_{s2})(i'_{s2}i_{s1} - i'_{s1}i_{s2})}$$

Result: $U_{LB,L1}, U_{LB,L2}, U_{LB,L3}, U_{LB,L1-L2}, U_{LB,L2-L3}, U_{LB,L3-L1}$ IV.) Postprocessing of the calculation results:
Calculation of the median $\tilde{U}_{LB}(v)$ for the range v−m to v−1
Result: $\tilde{U}_{LB,L1}, \tilde{U}_{LB,L2}, \tilde{U}_{LB,L3}, \tilde{U}_{LB,L1-L2}, \tilde{U}_{LB,L2-L3}, \tilde{U}_{LB,L3-L1}$

| Setting value | Setting range | Rec. setting |
|---|---|---|
| m | 0 . . . 1000 | 50 |

V.) Threshold Value Comparison for the Median of the Arc Voltage:

$\tilde{U}_{LB,L1}, \tilde{U}_{LB,L2}, \tilde{U}_{LB,L3}, \tilde{U}_{LB,L1-L2}, \tilde{U}_{LB,L2-L3}, \tilde{U}_{LB,L3-L1}$ $$D(v) = \begin{cases} 0 & \text{for } \tilde{U}_{LB}(v) < U_{I-RLs}^{LB} \\ 1 & \text{for } \tilde{U}_{LB}(v) \geq U_{I-RLs}^{LB} \end{cases}$$

Result: $D_{L1}, D_{L2}, D_{L3}, D_{L1-L2}, D_{L2-L3}, D_{L3-L1}$ as first to sixth arc fault identification signal.

from the phase-neutral conductor voltage values ($u_{L1}$, $u_{L2}$, $u_{L3}$) and phase-phase voltage values ($u_{L1-L2}$, $u_{L2-L3}$, $u_{L3-L1}$) in each case a seventh to twelfth arc voltage is calculated, which is compared with seventh to twelfth threshold values, such that a seventh to twelfth arc fault identification signal is output, in particular by:

1.) Calculation of the equivalent voltage jump of the arc voltage, for example with the aid of calculation by way of the so-called W-RU algorithm, with:

$u_{L1}, u_{L2}, u_{L3}, u_{L1-L2}, u_{L2-L3}, u_{L3-L1}$ $$\Delta U_{equi}(v) = \frac{2}{a}\left[\sum_{k=v-\frac{a}{2}+1}^{v} u_m(k) - \sum_{k=v-a+1}^{v-\frac{a}{2}} u_m(k)\right]$$

Result: $\Delta U_{equa,L1}$, $\Delta U_{equi,L2}$, $\Delta U_{equi,L3}$, $\Delta U_{equi,L1-L2}$, $\Delta U_{equi,L2-L3}$, $\Delta U_{equi,L3-L1}$

| Setting value | Setting range | Rec. setting |
|---|---|---|
| Dilatation parameter a | 2 ... 1000 | 10 |

2.) Calculation of the signum function of the current change:

$$\frac{di_{L1}}{dt}, \frac{di_{L2}}{dt}, \frac{di_{L3}}{dt}, \frac{di_{L1-L2}}{dt}, \frac{di_{L2-L3}}{dt}, \frac{di_{L3-L1}}{dt}$$

$$s_{di}(v) = \text{sgn}\left(\frac{di}{dt}\bigg|_v\right)$$

Result: $s_{di,L1}, s_{di,L2}, s_{di,L3}, s_{di,L1-L2}, s_{di,L2-L3}, s_{di,L3-L1}$ 3.) Calculation of the arc-related voltage jump:

$$U_{equi}^{LB}(v) = U_{equi}(v) \cdot s_{di}(v)$$

Result: $U_{equi,L1}^{LB}, U_{equi,L2}^{LB}, U_{equi,L3}^{LB}, U_{equi,L1-L2}^{LB}, U_{equi,L2-L3}^{LB}, U_{equi,L3-L1}^{LB}$ 4.) Threshold value comparison for the arc-related voltage jump:

$$U_{equi,L1}^{LB}, U_{equi,L2}^{LB}, U_{equi,L3}^{LB}, U_{equi,L1-L2}^{LB}, U_{equi,L2-L3}^{LB}, U_{equi,L3-L1}^{LB}$$

$$U_{equi}^{LBs}(v) = \begin{cases} 0 & \text{for } U_{equi}^{LB}(v) < U_{W-RU}^{LB} \\ U_{equi}^{LB} & \text{for } U_{equi}^{LB}(v) \geq U_{W-RU}^{LB} \end{cases}$$

Result: $U_{equi,L1}^{LBs}, U_{equi,L2}^{LBs}, U_{equi,L3}^{LBs}, U_{equi,L1-L2}^{LBs}, U_{equi,L2-L3}^{LBs}, U_{equi,L3-L1}^{LBs}$

| Setting value | Setting range | Rec. setting |
|---|---|---|
| Threshold value $U_{W-BU}^{LB}$ | 0 ... 1000 V | 12 V |

5.) Calculation of the summed voltage jump of the arc voltage, calculation of the relative, equivalent voltage jump:

$$U_{equi}^{a}(v) = \begin{cases} 0 & \text{for } U_{equi}^{LBs}(v) = 0 \\ \dfrac{U_{equi}^{LBs}(v)}{a} & \text{for } U_{equi}^{LBs}(v) \neq 0 \end{cases}$$

Result: $U_{equi,L1}^{a}, U_{equi,L2}^{a}, U_{equi,L3}^{a}, U_{equi,L1-L2}^{a}, U_{equi,L2-L3}^{a}, U_{equi,L3-L1}^{a}$ 6.) Calculation of the summed, equivalent voltage jump:

$$U_{equi}^{sum}(v) = \sum_{k=v-b+1}^{v} U_{equi}^{aR}(k)$$

Result: $U_{equi,L1}^{sum}, U_{equi,L2}^{sum}, U_{equi,L3}^{sum}, U_{equi,L1-L2}^{sum}, U_{equi,L2-L3}^{sum}, U_{equi,L3-L1}^{sum}$

| Setting value | Setting range | Rec. setting |
|---|---|---|
| Summation parameter b | 0 ... 1000 | 50 |

7.) Threshold value comparison for the summed, equivalent voltage jump:

$$U_{equi,L1}^{sum}, U_{equi,L2}^{sum}, U_{equi,L3}^{sum}, U_{equi,L1-L2}^{sum}, U_{equi,L2-L3}^{sum}, U_{equi,L3-L1}^{sum}$$

$$W(v) = \begin{cases} 0 & \text{for } U_{equi}^{sum}(v) < U_{W-Rus}^{LB} \\ 1 & \text{for } U_{equi}^{sum}(v) \geq U_{W-Rus}^{LB} \end{cases}$$

Result: $W_{L1}, W_{L2}, W_{L3}, W_{L1-L2}, W_{L2-L3}, W_{L3-L1}$ as seventh to twelfth arc fault identification signals.

an output-side arc fault identification signal SLB is output if at least one overcurrent signal and one arc fault identification signal are present.

In one configuration, an output-side arc fault identification signal SLB is output only if at least one overcurrent signal and one arc fault identification signal are present within a time period, i.e. at the same time or approximately at the same time, alternatively if the evaluation is carried out within a so-called fault loop or fault-loop-selectively, i.e. the conditions have to be present at the same time for the same or parallel fault loop(s).

This has the particular advantage that a comprehensive identification of arc faults is made possible since the presence of such is checked by way of two functions and an overcurrent identification. Arc faults often occur only at relatively high currents. This is taken into account in the evaluation according to an embodiment of the invention. Consequently, arc faults of different types can be detected and comprehensive protection of installations can be realized. Moreover, the method is very fast, such that arc faults can be identified rapidly and switched off without delay.

Advantageous configurations of embodiments of the invention are specified in the claims.

In one advantageous configuration of an embodiment of the invention, the three-phase alternating current circuit is a low-voltage circuit. This has the particular advantage that at least one embodiment of the invention can be used particularly effectively here.

In one advantageous configuration of an embodiment of the invention, the current to be measured or the current variables determined is/are filtered by a low-pass filter, such that instead of the phase conductor values (iL1, iL2, iL3, iE) and values for the change in the electrical current with respect to time (diL1/dt, diL2/dt, diL3/dt, diE/dt), filtered phase conductor values (iF,L1, iF,L2, iF,L3, iF,E) and filtered values for the change in the electrical current with respect to time (diF,L1/dt, diF,L2/dt, diF,L3/dt, diF,E/dt) present, which are used at least for part of the further calculation, in particular for the calculation of the current root-mean-square values.

This has the particular advantage that the calculation is corrupted only to a small extent by harmonic components and a reliable arc fault identification is thus made possible.

In one advantageous configuration of an embodiment of the invention, the low-pass filter has a cut-off frequency in the range of 50 hertz to 10 000 hertz, in particular in the range of 50 hertz to 1000 hertz, more specifically of 300 hertz.

This has the particular advantage that a particularly good arc fault identification is thereby made possible.

In one advantageous configuration of an embodiment of the invention, the low-pass filter is a filter in the 1st to 6th order range.

This has the particular advantage that a particularly good arc fault identification is thereby made possible.

In one advantageous configuration of an embodiment of the invention, an output-side arc fault identification signal is output if at least one overcurrent signal and one arc fault identification signal of the same phase-neutral conductor or phase-phase basis are present.

This has the particular advantage that in critical cases an arc fault signal is output only if an arc fault is present with high probability.

In one advantageous configuration of an embodiment of the invention, from the phase-neutral conductor voltage values (uL1, uL2, uL3) and phase-phase voltage values (uL1-L2, uL2-L3, uL3-L1), in each case a seventh to twelfth arc voltage is calculated in such a way that per phase-neutral conductor and phase-phase voltage values:

continuously a first half of a first number of voltage values (u(n), u(k)) is summed to form a first subtotal (TS1) and the second half of voltage values (u(n), u(k)) is summed to form a second subtotal (TS2), a difference (DU) between the two subtotals is determined, in that in the event of these seventh to twelfth differences (DU) exceeding the seventh to twelfth threshold values in terms of magnitude, a seventh to twelfth arc fault identification signal is output.

This has the particular advantage that a particularly accurate arc fault identification is thereby made possible by determination of a voltage jump.

In one advantageous configuration of an embodiment of the invention, continuously a second number of differences (DU) are summed to form a difference total (DS), instead of the difference (DU) the difference total (DS) is compared with a threshold value and, in the event of the latter being exceeded in terms of magnitude, an arc fault identification signal is output.

This has the particular advantage that an even more accurate arc fault identification is thereby made possible.

In one advantageous configuration of an embodiment of the invention, from the phase-neutral conductor voltage values ($u_{L1}$, $u_{L2}$, $u_{L3}$) phase-phase voltage values ($u_{L1-L2}$, $u_{L2-L3}$, $u_{L3-L1}$), phase conductor current values ($i_{L1}$, $i_{L2}$, $i_{L3}$), concatenated currents ($i_{L1-L2}$, $i_{L2-L3}$, $i_{L3-L1}$), values for the change in the electrical current with respect to time ($di_{L1}/dt$, $di_{L2}/dt$, $di_{L3}/dt$) and concatenated change current values per phase-neutral conductor and per phase-phase, in each case the first, second, third, fourth, fifth and sixth arc voltages are implemented by an integral equation or the solution thereof.

This has the particular advantage that a comprehensive calculation possibility taking account of many parameters of a real circuit is available.

In one advantageous configuration of an embodiment of the invention, the electrical voltage values or/and current variables are determined with a fixed time separation (dt).

This has the particular advantage that a particularly accurate determination of arc faults is made possible since values are present at regular intervals and the arc fault criteria can thus be determined particularly well.

In one advantageous configuration of an embodiment of the invention, the arc fault identification unit is configured in such a way that the voltage values are determined with a multiple of the frequency of the low-voltage circuit or with a sampling frequency in the range of 2-100 kHz, in particular in the range of 10 to 40 or 60 kHz, more specifically 40-50 kHz.

This has the particular advantage that an optimum number of voltage values are present for the evaluation according to an embodiment of the invention. Given a grid frequency of the low-voltage circuit of 50 or 60 Hz, approximately 1000 voltage values are thus present per fundamental wave of the grid frequency. With this number a good identification of arc faults has been manifested by way of an embodiment of the invention.

In one advantageous configuration of an embodiment of the invention in which subtotals are determined, the evaluation unit is configured in such a way that the first number is determined by a time window. In other words, the number of current values to be summed is determined by a time window to be used. From the time window, which can be for example in the range of 0.1 to 5 ms or 10 ms, in particular can be at 1 ms, the first number of voltage values furthermore arises as a result of the sampling frequency used.

This has the particular advantage that the evaluation is carried out continuously and a particularly accurate identification of arc faults is thus made possible.

In one advantageous configuration of an embodiment of the invention in which subtotals are determined, the evaluation unit is configured in such a way that the difference (DU) is multiplied by a factor whose size is dependent on the first number. In particular, the factor is a product of a constant and the reciprocal of the first number.

This has the particular advantage that a normalized difference (DU) is available, which is compared with a normalized first threshold value. An evaluation with objective comparison is thus made possible.

In one advantageous configuration of an embodiment of the invention in which subtotals are determined, the evaluation unit is configured in such a way that continuously a second number of differences (DU) are summed to form a difference total (DS), instead of the difference (DU) the difference total (DS) is compared with the threshold value and, in the event of the latter being exceeded in terms of magnitude, an arc fault identification signal is output.

This has the particular advantage that an even more accurate determination of arc faults is made possible since the differences which occur in the case of arc faults are summed. A more accurate or larger value is thus available for the threshold value comparison.

In one advantageous configuration of an embodiment of the invention, the sensors are arranged externally, i.e. do not have to be arranged in the housing of the arc fault identification unit. The periodic or continuous determination of value pairs of a voltage value and a current variable, in particular at one point in time, can be carried out for example by sampling of the corresponding values.

This has the particular advantage that a flexible determination of arc faults is afforded.

An embodiment of the invention furthermore provides a circuit breaker for an electrical circuit, in particular low-voltage circuit. The circuit breaker comprises an arc fault identification unit according to an embodiment of the invention. The latter is connected to the circuit breaker, wherein these are configured in such a way that when an arc fault identification signal is output, the circuit breaker trips, i.e. interrupts the electrical circuit. Quenching of the arc fault can thus be achieved. If the circuit breaker comprises an electronic trip unit, it is possible to achieve very fast tripping of the circuit breaker when an arc fault identification signal is present.

This has the particular advantage that a circuit breaker is extended by a further, advantageous functionality for protecting electrical installations. In this case, arc faults are advantageously identified and switched off in one device. If appropriate, existing assemblies, such as voltage or/and current sensors, power supply unit, microprocessors for the evaluation unit, etc. can be concomitantly used and synergies can thus be obtained.

An embodiment of the invention furthermore provides a short-circuiter, comprising an arc fault identification unit connected to the short-circuiter. These are configured in such a way that when an arc fault identification signal is output, the short-circuiter short-circuits the electrical circuit in order to cause the arc fault to be quenched.

This has the particular advantage that a simple, fast and effective possibility for quenching arc faults is available.

An embodiment of the invention furthermore provides a method for arc fault identification for an electrical circuit.

This has the particular advantage of a simple method for arc fault identification.

All configurations and features of embodiments of the invention bring about an improvement in the identification of arc faults and/or the quenching thereof.

In a circuit or grid in which an arc fault burns, a current and voltage profile having a significant profile can be measured. A typical voltage and current profile for an arc fault is illustrated in FIG. 1. The latter shows an illustration of a diagram illustrating the time profile of the electrical voltage U and of the electrical current I after ignition of an arc or arc fault, in particular parallel arc fault, in an electrical circuit, in particular low-voltage circuit.

Time t in milliseconds (ms) is represented on the horizontal X-axis. The magnitude of the electrical voltage U in volts (V) is depicted on the vertical Y-axis on the left scale. The magnitude of the electrical current I in amperes (A) is depicted on the right scale.

After arc ignition, the current I has an approximately sinusoidal profile. The voltage U has a profile that is severely distorted, approximately "sawtooth-shaped", with rapid voltage changes. Roughly interpreted, to a first approximation, the voltage profile is rectangular, instead of a conventional sinusoidal profile. Considered in the abstract, it is possible to identify in the voltage profile a rectangular waveform exhibiting a highly stochastic component on the plateau. The rectangular waveform is characterized by the fact that during the arc ignition and in the subsequent voltage zero crossings of the AC voltage, significantly increased voltage changes occur, which are referred to hereinafter as voltage jump, since the rise in the voltage change is significantly greater in comparison with a sinusoidal voltage profile.

In contrast to the voltage profile, the current profile of an arc fault has a virtually sinusoidal profile. At the point in time of the arc ignition, however, a reduction in the current rise occurs, which can be accounted for by the physical, current-limiting effect of arcs. In addition, a significant change in the rise in the current profile occurs at each further current zero crossing after an arc ignition.

According to an embodiment of the invention, such voltage changes or voltage jumps are intended to be used for arc fault identification. Furthermore, the arc voltage is intended to be calculated. In this case, the identification is intended to be carried out according to an embodiment of the invention by way of at least two different determination methods.

For this purpose, voltage values and current variables of an electrical circuit are determined, detected, sampled and measured periodically, for example with a fixed sampling time or sampling frequency fa. In this case, the sampling frequency or measurement frequency should be a multiple of the frequency of the measured AC variables. By way of example, in the case of conventional power grids, with a grid frequency of 50 Hz or 60 Hz, for example, the measurement frequency could be in the kilohertz range, for example between 1 and 200 kHz, more specifically in the range of 10 to 40 or 60 kHz, in particular 40-50 kHz.

The electrical voltage values and electrical current values are determined continuously or periodically, for example by way of a respective sensor. In a three-phase alternating current circuit, in this case in particular the voltages between phase and neutral conductor
3×conductor-neutral conductor voltage: $u_{L1}$, $u_{L2}$, $u_{L3}$
and between the phases $$u_{L1-L2}(v) = u_{L1}(v) - u_{L2}(v)$$

$$u_{L2-L3}(v) = u_{L2}(v) - u_{L3}(v)$$

$$u_{L3-L1}(v) = u_{L3}(v) - u_{L1}(v)$$

are determined, determined, as already explained. In this case, by way of example, the electrical current
3×conductor current: (or generally im)
can be measured directly. Alternatively, the change in the current with respect to time can also be measured.

In the case of the measurement of the electrical current im, the change in the current with respect to time i'm can be determined therefrom, for example by differentiation of the current value im.

In the case of the measurement of the change in the electrical current with respect to time i'm, the electrical current im can be determined therefrom, for example by integration of the change in the electrical current with respect to time i'm. The measurement of the change in the electrical current with respect to time i'm can be carried out for example using a Rogowski coil. In the case of sinusoidal currents in the circuit, the integration can be realized particularly easily since the integral of sine is cosine and the integral of cosine is sine.

The current value im and the change in the current with respect to time i'm can likewise also be measured in parallel, e.g. using two sensors. A conversion is thus unnecessary.

Voltage values $u_{L1}(v), u_{L2}(V), u_{L3}(v)$ (generally: um or um) and current values $i_{L1}(v), i_{L2}(V), i_{L3}(v)$ (generally: im or im) and values for the change in the electrical current with respect to time i'm are determined repeatedly with a time interval, for example a fixed time interval dt (sampling frequency).

Here for example a voltage value and a current variable are determined in each case at an, in particular identical, point in time.

The arc fault identification or function is carried out firstly for example by way of a subtotal calculation, also referred to as W-RU or W-RUs, as explained further above. This will be explained in greater detail once again in a general form.

According to an embodiment of the invention, the voltage jump in the case of the arc ignition and at each subsequent voltage zero crossing is intended to be identified in order to detect an arc fault. A major advantage in the extraction of this signal property in the voltage profile is the periodic occurrence. Additional detection reliability can thus be achieved if, intentionally or unintentionally, the first occurrence of the signal property in the case of arc ignition does not lead to a detection of the arc fault.

For the extraction of the signal property, according to an embodiment of the invention, a summation with difference calculation is intended to be used, which is intended to be referred to as W-RU and in one configuration as W-RUs method.

The evaluation is carried out to the effect that a difference or a voltage jump DU is introduced. This is determined as follows, wherein the voltage values um or um hereinafter are also denoted as u(k) or u(n) depending on the point in time:

$$DU(n) = \sum_{k=n-(j-1)}^{k=n-\frac{j}{2}} u(k) - \sum_{k=n-(\frac{j}{2}-1)}^{k=n} u(k) \qquad (1)$$

wherein:
u(k) voltage value at (past) point in time k
u(n) voltage value at present point in time n
DU(n) difference at the present point in time n
j first number, i.e. number of points in time or samples used for the calculation of the difference.

The difference DU(n) is determined for a presently measured voltage value u(n) using the above formula. The first number j, which may be a fixed number, for example, serves as a basis for the calculation. By way of example, a fixed number j of samples is used for each calculation. By way of example, j may be in the range of 10 to 100, in particular in the range of 40-50.

The calculation is intended to be illustrated for the case j=40. For this purpose, use is made of the presently measured voltage value u(n) and the preceding or respectively past or previous 39 voltage values
u(n−1) to u(n−(40−1)), i.e.
u(n−1) to u(n−40+1), i.e.
u(n−1) to u(39).
In total, (j=)40 voltage values.
For the first subtotal (TS1), the voltage values u(k) for k=n−(j−1)=n−(40−1)=n−39 to k=n−j/2=n−40/2=n−20 are summed, that is to say from the past (older) 39th voltage value to the past (younger) 20th voltage value, in total 20 values.

As the second subtotal (TS2), the voltage values u(k) for k=n−(j/2−1)=n−(40/2−1)=n−19 to k=n are summed, that is to say from the past 19th voltage value to the present voltage value u(n), in total likewise 20 voltage values.

The difference DU of both subtotals is compared in terms of magnitude with a threshold value, dependent on the number j, i.e. dependent on which voltage value is considered, phase-phase or phase-neutral conductor, one of the seventh to twelfth threshold values, wherein the threshold values for the phase-phase relationship can be identical in terms of magnitude and the threshold values for the phase-neutral conductor relationship can be identical in terms of magnitude. If the threshold value is exceeded, depending on which relationship is concerned, a seventh to twelfth arc fault identification signal is output: $W_{L1}, W_{L2}, W_{L3}, W_{L1-L2}, W_{L2-L3}, W_{L3-L1}$.

In this case, the respective halves of the first number j are summed. A half in the context of embodiments of the invention also means a half value deviating by a value. In other words, in accordance with a first variant, 19 values could be summed in the first subtotal and 21 values could be summed in the second subtotal, wherein j has the value 40.

In a second variant, an odd first number j means an asymmetrical division. In other words, by way of example, 19 values can be summed in a first subtotal and 20 values can be summed in the second subtotal, wherein j would have the value 39 in this case.

Average values can also be used as subtotals, the average values being determined from the respective voltage values, for example by way of subtotals. In other words, an average value could also be formed from a greatly deviating number of voltage values, for example per subtotal.

Alternatively, both subtotals and the difference can be multiplied by a factor containing for example the reciprocal of the first number j, that is to say for example by 1/j or 2/j.

$$DU(n) = \frac{2}{j}\left[\sum_{k=n-j+1}^{k=n-\frac{j}{2}} u(k) - \sum_{k=n-\frac{j}{2}+1}^{k=n} u(k)\right] \qquad (2)$$

As a result, a comparison in terms of magnitude with a threshold value independent of the number of samples used, i.e. independent of the first number, is possible since the difference corresponds in normalized fashion to the voltage used in the circuit, that is to say corresponds to the voltage jump equivalently taking place.

The value of the difference is thus no longer dependent on the number of summations but on the voltage used.

In accordance with the first or second variant, the half can be divided into a first subtotal number g and h, wherein j=g+h and g≠h.

$$DU(n) = \frac{1}{g}\sum_{k=n-(g+h)+1}^{k=n-h} u(k) - \frac{1}{h}\sum_{k=n-h+1}^{k=n} u(k) \qquad (3)$$

The first number j or number of samples j used determines the time frame used by way of the sampling frequency used.

Conversely, given a predefined sampling frequency and time window to be checked, the first number to be used can be determined.

The three variables of time window ta, sampling frequency fa and number of samples (=first number) j can each be expressed in terms of one another, j=ta·fa.

Given a grid frequency of the low-voltage circuit of 50-60 Hz, a sampling frequency of 1 to 200 kHz, in particular 1 to 60 kHz, more specifically 40-50 kHz, and a time window or a dilatation time of 0.1 ms to 5 ms or 10 ms, in particular of approximately 1 ms, have been found for reliable detection of arc faults. Consequently, for the first number j of required samples or sampling points, this results in j=40-50.

Dilatation time means the extent of the time window over which the subtotals or the equivalent voltage jump are/is calculated.

The two subtotals TS1 and TS2 can also be interchanged. That is to say that the first subtotal is subtracted from the second subtotal. This merely changes the sign. By way of example, in an analogous manner in the case of AC grids after an edge change, i.e. when a change is made from a rising edge to a falling edge of the typically sinusoidal AC voltages, a sign change can likewise occur.

In the case of sinusoidal voltages, a rising edge usually occurs in the range of 0° to 90° and 270° to 360°; a falling edge usually occurs in the range of 90° to 270°.

If the difference DU is exceeded in terms of magnitude, an arc fault identification signal is output.

By way of example, the threshold value in the case of a normalized calculation can be in the range of 8 volts to 300 volts, in particular 10 to 30 or 100 volts, more specifically in the range of 15 to 20 or 25 volts.

In this case, reference shall be made to the fact that the calculated difference DU or equivalent voltage jump is below the real voltage jump, identifiable in the voltage profile.

A further improvement can be achieved by way of a further summation of the differences DU to form a difference sum DS. This is also referred to hereinafter as W-RUs method. In the case of arc faults that do not generate a large voltage jump, a faster detection can thus be achieved.

In the case of the W-RUs method, individual differences or voltage jumps that occur particularly in the case of arc ignition as a consequence of a plurality of small arcs igniting successively are added.

The determined differences DU are summed with a second number z, which may be in the range of the first number j or else greater or lower, to form a difference sum DS. By way of example, the second number z may have from one to four to six times the value of j.

$$DS(n) = \Sigma_{k=n-z}^{k=n} DU(k) \qquad (4)$$

z second number, i.e. number of differences DU used for the calculation of the difference sum DS(n) difference sum, relative to the present value n In this case, the second number z can again be determined by way of the sampling frequency fa and the time window ts to be considered for the summation, z=ts·fa.

It has been found that, when using the summation, the first time window or the first dilatation time ta can or should be chosen to be smaller for the calculation of the individual voltage jump. In this case, the time ta could be approximately 0.05 to 1 ms, in particular 0.2 ms.

Furthermore, it has proved to be advantageous if the differences used for the summation are not used a second time, for the subsequent summation.

For a simple implementation of the algorithm in terms of programming, by way of example, for each voltage value u(n) or sampling point, it is possible to calculate a relative, equivalent voltage jump or sampling difference DA(n) per voltage value u(n) relative to the first number j or size of the dilatation parameter as follows:

$$DA(n) = \frac{DU(n)}{j} \qquad (5)$$

In other words, the difference DU is divided by the first number j in order to obtain the sampling difference for a voltage value u(n). The calculated sampling difference DA(n) describes the relative, equivalent voltage jump per voltage value u(n) or sample.

By way of example, a first voltage value u(1) of 36 volts, a subsequent second voltage value u(2) of 40 volts, a subsequent third voltage value u(3) of 50 volts, a subsequent fourth voltage value u(4) of 60 volts, a subsequent fifth voltage value u(5) of 70 volts, a subsequent sixth voltage value u(6) of 72 volts, and a subsequent seventh voltage value u(7) of 74 volts are measured.

By way of example, the first number j has a value of 4.

In accordance with formula 2, the first subtotal is 76 volts, and the second subtotal is 110 volts. The pure difference of the subtotals is 34 volts, multiplied by 2/j, i.e. 2/4, the difference DU(4) is 17 volts. In other words, the difference corresponds to an averaged voltage jump over the four voltage values of 17 volts.

Relative to the first four voltage values u(1), . . . , u(4) or samples, the sampling difference DA(4) is: 17 volts divided by 4 equals 4.25 volts (i.e. the relative voltage jump per voltage value).

Relative to the next four voltage values u(2), . . . , u(5), the difference of the subtotals is 130 volts−90 volts=40 volts. The difference DU(5) is then 20 volts again. The sampling difference DA(5) is 5 volts (i.e. the relative voltage jump per voltage value).

Relative to the next four voltage values u(3), . . . , u(6), the difference of the subtotals is 142 volts−110 volts=32 volts; the difference DU(6) is then 16 volts, and the sampling difference DA(6) is 4 volts (i.e. the relative voltage jump per voltage value).

Relative to the next four voltage values u(4), . . . , u(7), the difference of the subtotals is 146 volts−130 volts=16 volts; the difference DU(7) is then 8 volts, and the sampling difference DA(7) is 2 volts (i.e. the relative voltage jump per voltage value).

In one configuration of an embodiment of the invention, the respective maximum value is then intended to be summed for each (continuously) calculated sampling difference DA(n).

For this purpose, the sampling difference DA(n) is assigned to each of the j voltage values which were used for the calculation of the difference and sampling difference; see the following table.

| n | U(n) | DA(1) | DA(2) | DA(3) | DA(4) | DA(5) | DA(6) | DA(7) | DAmax(n) |
|---|---|---|---|---|---|---|---|---|---|
| 1 | 36 V | 4.5 V<br>(0 V) | 9.5 V<br>(0 V) | 6.75 V<br>(0 V) | 4.25 V | | | | 4.25 V |
| 2 | 40 V | | 9.5 V<br>(0 V) | 6.75 V<br>(0 V) | 4.25 V | 5 V | | | 5 V |
| 3 | 50 V | | | 6.75 V<br>(0 V) | 4.25 V | 5 V | 4 V | | 5 V |
| 4 | 60 V | | | | 4.25 V | 5 V | 4 V | 2 V<br>[0 V] | 5 V |
| 5 | 70 V | | | | | 5 V | 4 V | 2 V<br>[0 V] | 5 V |
| 6 | 72 V | | | | | | 4 V | 2 V<br>[0 V] | 4 V |
| 7 | 74 V | | | | | | | 2 V<br>[0 V] | 2 V<br>[0 V] |

If the first number j of voltage values U(n), u(k) are not yet present for a calculation, the differences or sampling differences can be set to zero; see the values of 0 volts indicated between parentheses in columns DA(1), DA2, DA(3).

The maximum sampling difference DAmax(n) is determined in each case from the j assigned sampling differences per voltage value U(n). In this case, only fewer than j sampling differences DA are present of course for the sampling differences DA(n) just past, in which case the present or maximum sampling difference DA of the available sampling differences is then used.

The maximum sampling differences DAmax per voltage value U(n) are summed to form a sum of the maximum sampling differences SMA, specifically in each case a second number z of maximum sampling differences SMA.

$$SMA(n) = \sum_{k=n-z}^{k=n} DA\max(k) \quad (6)$$

If the second number z has a value of z=6, for example, this results in a sum of the maximum sampling differences for the first six maximum sampling differences of SMA (6)=28.25 volts.

The sum of the maximum sampling differences SMA or the magnitude thereof is compared with the threshold value and, if the threshold value is exceeded in terms of magnitude, an arc fault identification signal is output.

This has the advantage that a plurality of successively occurring voltage jumps are summed and the sum thereof is used for the evaluation of the presence of an arc fault.

In one configuration of an embodiment of the invention, a further threshold value comparison can be provided to the effect that, for the calculation of the sampling difference DA(n), the value of DU(n) is set to zero if the magnitude thereof falls below a limit value GW.

For a low-voltage grid, the limit value GW can be in the range of 8 volts to 50 volts, in particular 10 to 30, more specifically in the range of 10 to 20 or 25 volts.

It can also be identical to the magnitude of the customary threshold values or be of the order of magnitude thereof.

This has the advantage that the typical—usually sinusoidal—voltage profile is not taken into account or is taken into account to a lesser extent.

By way of example, the seventh difference DU(7), which has the value of 8 volts, could, in accordance with an example, be below the limit value GW in terms of magnitude, the limit value having a magnitude of 10 volts, for example. The seventh sampling difference DA(7) would thus have the value of 0 volts. This is illustrated by values of 0 volts in square brackets in particular in column DA(7).

Figure 2:
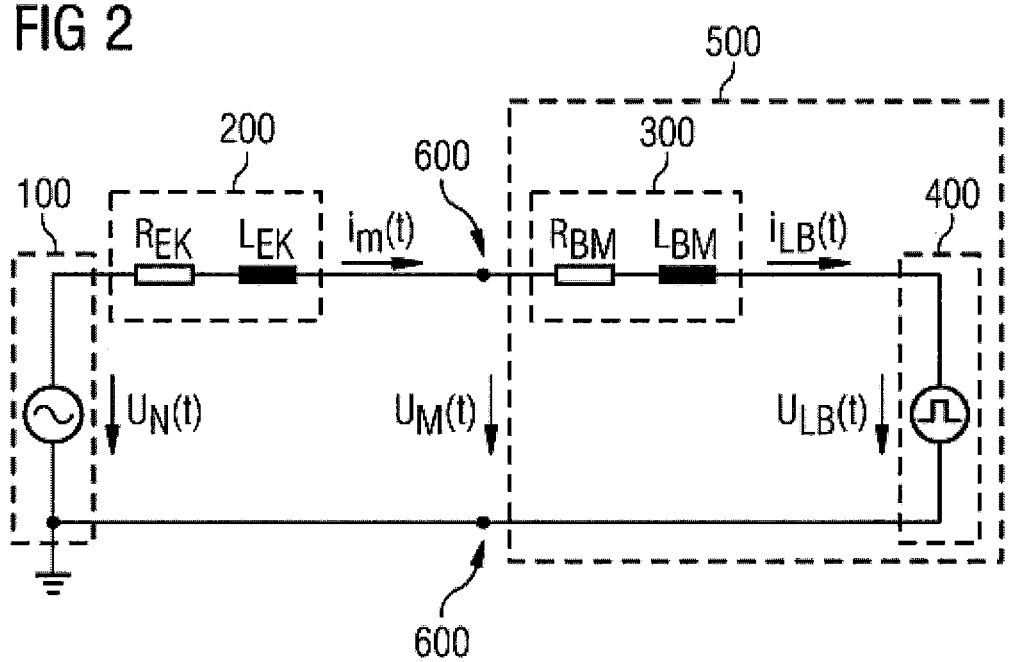
FIG. 2 shows an equivalent circuit diagram of an electrical circuit.

FIG. 2 shows an equivalent circuit diagram of an electrical circuit, wherein a three-phase alternating current grid would be realized in an analogous manner, comprising an electrical energy source 100, which provides an electrical grid voltage un(t), a grid access point connected thereto or an infeed cable 200, represented by electrical equivalent circuit elements, such as an infeed cable resistance Rek and an infeed cable inductance or coil Lek, which is followed by an electrical load, operating device(s) or energy sink 300, represented in turn by electrical equivalent circuit elements, such as a load resistance RBM and a load inductance or coil LBM. An electrical voltage um(t) and an electrical current variable, such as the electrical current value im(t) and/or the change in the current with respect to time i'm(t), or respectively the first derivative of the current with respect to time, can be measured between the infeed cable 200 and the load 300.

These variables, in particular the electrical voltage or electrical voltage values, are detected at the measurement points 600 in order to be processed further in the arc fault identification unit.

The region monitored with respect to arc faults is represented by a dashed line 500.

An arc fault can occur in the electrical circuit, the arc fault being represented by an arc 400 having an arc voltage Ulb(t). According to an embodiment of the invention, for the second arc fault identification function, an arc voltage Ulb is continuously calculated in the arc fault identification unit with the aid of the measured/sampled voltage Um(t) and the measured/sampled current variable (current or/and current change).

According to an embodiment of the invention, the voltage, the current and the change in the current with respect to time are used for the calculation. For this purpose, such a value pair is assigned to at least one value set. In one preferred embodiment, a value pair is assigned to exactly one value set. It is essential that a value set contains at least one value pair that is not contained in the preceding or succeeding value set.

According to an embodiment of the invention, an arc voltage is calculated from at least two value sets.

In one preferred configuration, a fixed number of value pairs, which are determined for example in chronological succession, for example at a fixed time interval, are assigned to a value set. By way of example, a value set contains 10 value pairs. The first 10 value pairs are assigned to the first value set. The second 10 value pairs are assigned to the second value set, and the third 10 value pairs are assigned to the third value set, etc.

In each case at least two value sets are used for the determination of an arc voltage or of an arc fault. The calculation is carried out continuously, that is to say for example first calculation with the value sets 1 and 2 or 1 to 3, second calculation according to an embodiment of the invention with the value sets 2 and 3 or 2 to 4, etc. (first indication for calculation with two value sets, second indication for calculation with three value sets).

1st Example

By way of example, value pairs of 1 to x (x≥32; x∈N) are sampled and a value set consists of 10 value pairs. In each case 3 value sets are used for the determination of an arc voltage or an arc fault.

The value pairs 1-10 are assigned to the value set 1.
The value pairs 11-20 are assigned to the value set 2.
The value pairs 21-30 are assigned to the value set 3.

The calculation is carried out continuously, i.e. for example first calculation according to an embodiment of the invention with the value pairs 1 to 30, second calculation according to an embodiment of the invention with the value pairs 2 to 31, third calculation according to an embodiment of the invention with the value pairs 3 to 32, etc. Consequently, at each sampling point a calculation result is available for the subsequent evaluation.

2nd Example

Value sets can also be superimposed on one another for the calculation. In other words, two value sets can use one or more identical value pairs. In this case, the principle holds true here that each value set must contain at least one further value pair that is not used in the other value sets. By way of example, value pairs of 1 to x (x≥14; x∈N) are sampled and a value set consists of 10 value pairs. In each case 3 value sets are used for the determination of an arc voltage or an arc fault.

The value pairs 1-10 are assigned to the value set 1.
The value pairs 2-11 are assigned to the value set 2.
The value pairs 3-12 are assigned to the value set 3.

The calculation is carried out continuously, i.e. for example first calculation according to an embodiment of the invention with the value pairs 1 to 12, second calculation according to an embodiment of the invention with the value pairs 2 to 13, third calculation according to an embodiment of the invention with the value pairs 3 to 14, etc. Consequently, at each sampling point a calculation result is available for the subsequent evaluation.

3rd Example

For the calculation, the value sets can also have a different size. By way of example, value pairs of 1 to x (x≥17; x∈N) are sampled. In each case 3 value sets are used for the determination of an arc voltage or an arc fault, wherein the 1st value set consists of 6 value pairs, the 2nd value set consists of 15 value pairs and the 3rd value set consists of 9 value pairs.

The value pairs 1-6 are assigned to the value set 1.
The value pairs 1-15 are assigned to the value set 2.
The value pairs 6-15 are assigned to the value set 3.

The calculation is carried out continuously, i.e. for example first calculation according to an embodiment of the invention with the value pairs 1 to 15; the three value sets are contained therein. The second calculation according to an embodiment of the invention with the value pairs 2 to 16 and third calculation according to an embodiment of the invention with the value pairs 3 to 17, etc. Consequently, at each sampling point a calculation result is available for the subsequent evaluation.

By way of example, the value pairs can subsequently also be arranged in succession and be at an interval of a specific number of value pairs from one another.

The calculation is carried out by certain terms (mathematical expressions or equations) being calculated continuously.

The calculation of these terms is based on a solution of the 1st order line equation:

$$u_m(t) = R_{BM} \cdot i_m(t) + L_{BM} \frac{di_m(t)}{dt} \tag{1}$$

Assuming that an arc fault is present in the low-voltage grid, the electrical behavior would be comparable with that of a back-EMF source in the grid.

The following, extended ansatz differential equation results from this:

$$u_m(t) = R_{BM} \cdot i_m(t) + L_{BM} \frac{di_m(t)}{dt} + u_{LB}(t) \tag{2}$$

The arc fault is simulated in a simplified manner as a purely resistive load. It is thus assumed that the arc voltage is in phase with the arc current. The arc voltage can thus be described by the following equation:

$$u_{LB}(t) = U_{LB} \cdot \text{sign}(i_{LB}(t)) \tag{3}$$

If it is assumed that the measurement current im(t) corresponds to the arc fault current iLB(t), that is to say that no current branching is present between the measurement location and the arc fault burning location, the following can be written:

$$u_m(t) = R_{BM} \cdot i_m(t) + L_{BM} \frac{di_m(t)}{dt} + \text{sign}(i_m(t)) \cdot U_{LB} \tag{4}$$

In order to solve this extended ansatz differential equation, an integrating solution method is used according to an embodiment of the invention. This results in a complete, integrating ansatz:

$$\int u_m(t)dt = R_{BM} \int i_m(t)dt + L_{BM} \int \frac{di_m(t)}{dt} dt + U_{LB} \int \text{sign}(i_m(t))dt \tag{5}$$

The arc voltage is calculated by way of the steps mentioned further above. Alternatively, this can be carried out as follows by rearranging and solving equation (5) with respect to ULB.

The following ansatz equation is used for the calculation:

$$\int u_m(t)dt = R_{BM} \int i_m(t)dt + L_{BM} \int \frac{di_m(t)}{dt} dt + \\ U_{LB} \int \text{sign}(i_m(t))dt \\ = R_{BM} \int i_m(t)dt + L_{BM} \int i'_m(t)dt + \\ U_{LB} \int \text{sign}(i_m(t))dt \tag{6}$$

By way of example, the trapezoidal rule method according to equation (7) is used for the numerical integration.

$$\int_{t_A}^{t_E} f(t)dt = \frac{\Delta t}{2}\left[f(t_A) + 2\sum_{v=1}^{\frac{t_g-t_A}{\Delta t}-1} f(t_A + v \cdot \Delta t) + f(t_E)\right] \tag{7}$$

For a simplified representation of the solution, the integration intervals that are solved using the trapezoidal rule are substituted by the following terms:

$$u_s = \frac{\Delta t}{2}\left[u_m(t_A) + 2\sum_{v=1}^{\frac{t_g-t_A}{\Delta t}-1} u_m(t_A + v \cdot \Delta t) + u_m(t_g)\right] \tag{8}$$

$$i_s = \frac{\Delta t}{2}\left[i_m(t_A) + 2\sum_{v=1}^{\frac{t_g-t_A}{\Delta t}-1} i_m(t_A + v \cdot \Delta t) + i_m(t_g)\right] \tag{9}$$

$$i'_s = \frac{\Delta t}{2}\left[i'_m(t_A) + 2\sum_{v=1}^{\frac{t_g-t_A}{\Delta t}-1} i'_m(t_A + v \cdot \Delta t) + i'_m(t_g)\right] \tag{10}$$

$$s_s = \frac{\Delta t}{2}\left[\text{sign}(i_m(t_A)) + 2\sum_{v=1}^{\frac{t_g-t_A}{\Delta t}-1} \text{sign}(i_m(t_A + v \cdot \Delta t)) + \text{sign}(i_m(t_E))\right] \tag{11}$$

-continued $$t_s = \frac{t_E - t_A}{\Delta t}$$

In this case, the value ts is the number of value pairs per value set; $\Delta t$ corresponds to the reference sign dt, which corresponds to the time interval between the sampled voltage values or current variables, or value pairs.

The variable $t_E$ corresponds to the time of the chronologically last value pair of a value set; $t_A$ corresponds to the time of the chronologically first value pair of the value set.

With the formulae 8 to 11, the following terms are respectively calculated for a value set:

(8) A time/voltage sum product (us), formed from the time interval (dt) and the sum of the voltage values (um), wherein the sum of the voltage values is formed by half the first voltage value, half the last voltage value and the sum of the other voltage values of the value set.

(9) A time/current sum product (is), formed from the time interval (dt) and the sum of the current values, wherein the sum of the current values is formed by half the first current value, half the last current value and the sum of the other current values of the value set.

(10) A time/current change value product (i's), formed from the time interval (dt) and the sum of the values for the change in the current with respect to the time, wherein the sum of the values for the change in the current with respect to time is formed by half the first value, half the last value and the sum of the other values of the value set.

(11) A time/sign value product (ss), formed from the time interval (dt) and the sum of the sign values of the current values, wherein a sign value assumes the value plus one in the case of a positive current value, minus one in the case of a negative current value and zero in the case of a current value of zero, wherein the sum of the sign values is formed from half the sign value of the first current value, half the sign value of the last current value and the sum of the sign values of the other current values.

With the substituted terms, the equation system corresponding to ansatz equation 5 is obtained as:

$$u_s = R_{BM} i_s + L_{BM} i'_s + U_{LB} s_s \quad (13)$$

The equation system contains the three unknown variables RBM, LBM and ULB. For the solution thereof, (at least) two, and for a very accurate determination three, integration limits that are temporally different from one another are used, for example by two or three value sets being used according to an embodiment of the invention.

$$u_{s1} = R_{BM} i_{s1} + L_{BM} i'_{s1} + U_{LB} s_s$$

$$u_{s2} = R_{BM} i_{s2} + L_{BM} i'_{s2} + U_{LB} s_s$$

$$u_{s3} = R_{BM} i_{s3} + L_{BM} i'_{s3} + U_{LB} s_{s3} \quad (14)$$

The arc voltage ULB can consequently be calculated according to an embodiment of the invention using the following formula, for example.

$$U_{LB} = \frac{(u_{s1} i_{s2} - u_{s2} i_{s3})(i'_{s2} i_{s1} - i'_{s1} i_{s2}) -}{(s_{s1} i_{s2} - s_{s2} i_{s3})(i'_{s3} i_{s2} - i'_{s2} i_{s3}) -} \quad (15)$$
$$\phantom{U_{LB} = }\frac{(u_{s2} i_{s1} - u_{s1} i_{s2})(i'_{s3} i_{s2} - i'_{s2} i_{s3})}{(s_{s2} i_{s3} - s_{s3} i_{s2})(i'_{s2} i_{s1} - i'_{s1} i_{s2})}$$

wherein us, is, i's, ss are the time/voltage sum products, time/current sum products, time/current change value products, time/sign value products, in accordance with formulae 8 to 11, of a first, second and third value set, in accordance with the index.

The abbreviation sign or sgn represents the signum function or sign function. This function assigns to a number its sign. This is defined as follows:

sign(x)=+1, if x>0;

sign(x)=0, if x=0;

sign(x)=−1, if x<0.

Formula 14 consists of 12 products P1, . . . , P12, which contain:

a) products of time/voltage sum products us and time/current sum products is, b) products of time/current sum products is and time/current change value products i's, c) products of time/sign value products ss and time/current sum products is.

$$U_{LB} = \frac{(P1 - P2)(P3 - P4) - (P5 - P6)(P7 - P8)}{(P9 - P10)(P7 - P8) - (P11 - P12)(P3 - P4)} \quad (15)$$

$$U_{LB} = \frac{D1 * D2 - D3 * D4}{D5 * D4 - D6 * D2} \quad (16)$$

$$U_{LB} = \frac{P13 - P14}{P15 - P16} \quad (17)$$

$$U_{LB} = \frac{D7}{D8} \quad (18)$$

The 12 products form 6 different differences D1, . . . , D6.

The 6 differences D1, . . . , D6 in turn form four superordinate products P13, . . . , P16. The latter in turn form two superordinate differences D7, D8, with the aid of which an arc voltage can be determined. If the latter exceeds a respective one of the first to sixth threshold values in terms of magnitude, a first to sixth arc fault identification signal $D_{L1}, D_{L2}, D_{L3}, D_{L1-L2}, D_{L2-L3}, D_{L3-L1}$ is output in a manner dependent thereon.

The arc voltage can furthermore be calculated for example using the following, simplified formulae, which are likewise solutions of the integral equation. In this case, according to an embodiment of the invention only two value sets are required for the determination.

$$U_{LB} = \frac{u_{s2} i_{s1} - u_{s1} i_{s2}}{t_{s2} i_{s1} - t_{s1} i_{s2}} = \frac{P5 - P6}{P17 - P18} = \frac{D3}{D9}$$

$$U_{LB} = \frac{u_{s2} i_{s1} - u_{s1} i_{s2}}{s_{s2} i_{s1} - s_{s1} i_{s2}} = \frac{P5 - P6}{P10 - P9} = \frac{D3}{D10}$$

$$U_{LB} = \frac{u_{s2} i'_{s1} - u_{s1} i'_{s2}}{t_{s2} i'_{s1} - t_{s1} i'_{s2}} = \frac{P19 - P20}{P21 - P22} = \frac{D11}{D12}$$

$$U_{LB} = \frac{u_{s2} i'_{s1} - u_{s1} i'_{s2}}{s_{s2} i'_{s1} - s_{s1} i'_{s2}} = \frac{P19 - P20}{P23 - P24} = \frac{D11}{D13}$$

A further example calculation using three value sets is given in the following formula.

$$U_{LB} = \frac{(u_{s2} i_{s1} - u_{s1} i_{s2})(i'_{s3} i_{s1} - i'_{s1} i_{s3}) -}{(t_{s1} i_{s3} - t_{s3} i_{s1})(i'_{s2} i_{s1} - i'_{s1} i_{s2}) -}$$
$$\phantom{U_{LB} = }\frac{(u_{s3} i_{s1} - u_{s1} i_{s3})(i'_{s2} i_{s1} - i'_{s1} i_{s2})}{(t_{s1} i_{s2} - t_{s2} i_{s1})(i'_{s3} i_{s1} - i'_{s1} i_{s3})}$$

-continued $$U_{LB} = \frac{(P5 - P6)(P25 - P26) - (P27 - P28)(P3 - P4)}{(P29 - P30)(P3 - P4) - (P18 - P17)(P25 - P26)}$$

$$U_{LB} = \frac{D3\,D14 - D15\,D2}{D16\,D2 - D17\,D14}$$

$$U_{LB} = \frac{P31 - P32}{P33 - P34}$$

$$U_{LB} = \frac{D18}{D19}$$

Each solution of the integral equation, including a simplified one, constitutes an inventive use of an embodiment of the invention.

By way of example, the first to sixth threshold values or the magnitude thereof can be 30 volts in this case.

In general terms, the threshold value for a low-voltage grid can be in the range of 20 to 300 volts, more precisely in the range of 20 to 150 volts, more specifically in the range of 20 to 70 volts. Values of 25 to 50 volts, in particular, appear to be highly suitable.

In the calculation of the arc voltage with the evaluation according to an embodiment of the invention, major changes can occur upon the ignition of an arc. For fast and stable calculation of the arc voltage, improvements can therefore also be made in such a way that, for example, the sign or signum function is modified.

In general, the signum function is calculated from the measured current as follows:

$$s(t)=\text{sign}(i_m(t))$$

Stable calculation results are often present only for the time after the arc ignition when the measurement voltage has completely covered the burning arc and is completely contained in the two or three integration intervals or value sets. In the transition region, unstable calculation results can occur. If the calculation results are filtered for this region, then this gives rise to a slight delay in the detection, but with more reliable determination results. According to an embodiment of the invention, therefore, a further configuration can be used, in which the signum function is set to the value zero if the determined voltage falls below a thirteenth threshold value SW13, such as e.g. a voltage threshold value.

$$s(t)=0 || u_m(t)| \leq U_{I\text{-}RLs}{}^s$$

The result of the signum function is e.g. always set to zero if the magnitude of the, for example simultaneous, voltage value of the value pair is less than or equal to the thirteenth threshold value SW13, such as $U_{I\text{-}RLs}{}^s$. For this purpose, e.g. the anode-cathode voltage drop of approximately 20 V can be assumed as a typical threshold value, since it can be presumed that an arc cannot arise below this value. The thirteenth threshold value SW13 or $U_{I\text{-}RLs}{}^s$ can assume any value in the range of 5 to 150 volts, more specifically in the range of 10 volts to 50 volts, in particular 15 to 20 volts.

Introducing this constraint for the calculation of the signum function minimizes instabilities in the calculation of the arc voltage that possibly occur during the arc ignition.

In order still to avoid impermissible calculation results, according to an embodiment of the invention, the arc voltage can advantageously be set to the value zero if the sum of the two or three integrals ss of the signum function or the sum of the two or three time/sign value products ss yields the value zero.

$$U_{LB}=0 V | s_{s1}+s_{s2}=0$$

$$U_{LB}=0 V | s_{s1}+s_{s2}+s_{s3}=0$$

According to an embodiment of the invention, the arc fault identification can be combined with further criteria, for example with a further comparison of the magnitude of the electrical current of the circuit or of the respective conductor or ground current according to an embodiment of the invention. The measured current, in particular the root-mean-square value of the measured current, which can be calculated for example as explained in the introduction or according to the Mann-Morrison method, is compared in this case with first to fourth current threshold values SSW1, SSW2, SSW3, SSW4. If one of these current threshold values is exceeded, a first, second, third or/and fourth overcurrent signal $F_{L1}$, $F_{L2}$, $F_{L3}$, $F_E$ is output in a manner dependent thereon.

This criterion, referred to as overcurrent release, leads to reliable fault delimitation. For the arc fault identification, a minimum arc fault current must flow in the circuit in order to bring about an arc fault identification signal.

A value dependent on the operating current can be chosen as threshold value for the overcurrent release. Alternatively, the threshold value definition could also be effected in an arc-specific manner, since an arc current of usually 1000 A is necessary for a burning parallel low-voltage arc. A series arc is possible given significantly lower currents. In other words, the first to fourth current threshold values can have each value starting from 1 A, 10 A, 100 A, 1000 A or 5000 A, depending on use or application. The current threshold values can also be (approximately) identical in terms of magnitude.

Figure 3:
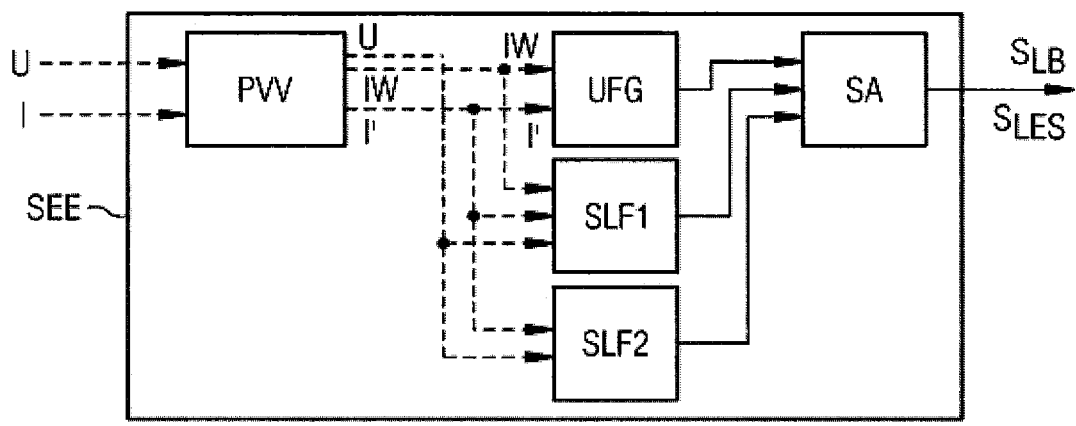
FIG. 3 shows a first block diagram of a solution according to an embodiment of the invention.

FIG. 3 shows a first block diagram of a solution according to an embodiment of the invention. An arc fault identification unit SEE is illustrated, to which determined variables for the voltage U and the current I are fed. The single-phase case is depicted. The three-phase case is evident in an analogous manner. The current I and the voltage U are fed to a process variable preprocessing unit PVV, which, from the current I fed, outputs a current value IW and a value for the change in the current with respect to the time I'. Furthermore, a filtering of the current and/or of the voltage can be carried out here, for example via a low-pass filter.

The voltage U and the current variables IW and I' are fed to a first arc fault identification function SLF1, which determines therefrom an arc fault identification signal, for example one of the first six arc fault identification signals, for example by way of an integrating algorithm, as described.

The voltage U, if appropriate the current IW and/or I', is fed to a second arc fault identification function SLF2, which determines therefrom a further arc fault identification signal, for example one of the seventh to twelfth arc fault identification signals, for example by way of a subtotal calculation of the voltage, W-RU or W-RUs algorithm, as described.

The current IW and, if appropriate, the change in the current I' are fed to an overcurrent release UFG, which determines therefrom an overcurrent signal, for example one of the four overcurrent signals, as described.

The overcurrent signal and the two arc fault signals are fed to a signal evaluation or combination SA, which outputs an output-side arc fault identification signal SLES or SLB given the presence of an overcurrent signal and one of the two (or both) arc fault identification signals.

Figure 4:
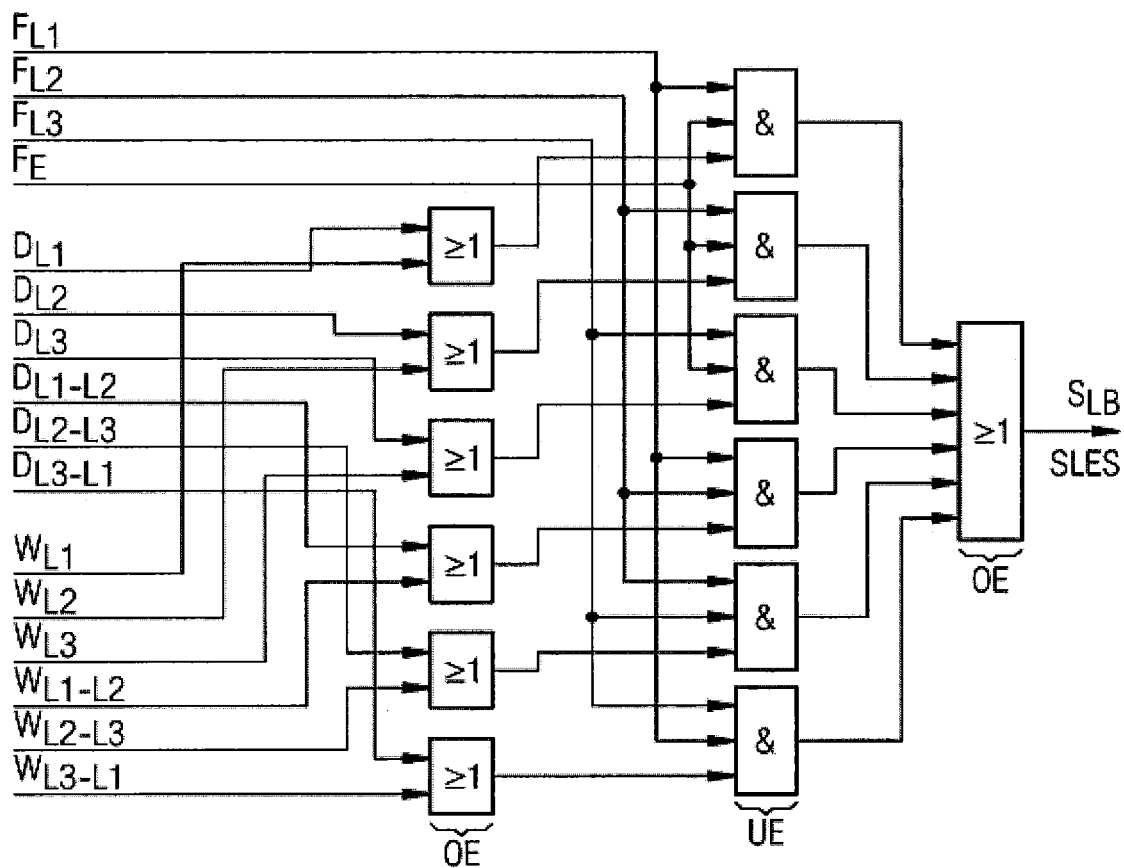
FIG. 4 shows a second block diagram of a solution according to an embodiment of the invention.

FIG. 4 shows a second block diagram, analogously to FIG. 3, with the evaluation for the three-phase case. The first six arc fault identification signals $D_{L1}, D_{L2}, D_{L3}, D_{L1\text{-}L2}, D_{L2\text{-}L3}, D_{L3\text{-}L1}$ and the seventh to twelfth arc fault identification signals $W_{L1}, W_{L2}, W_{L3}, W_{L1-L2}, W_{L2-L3}, W_{L3-L1}$ are respectively ORed in a phase-phase or phase-neutral conductor related manner, by for example six respective OR units OE. The outputs of the six OR units are respectively ANDed with the four overcurrent signals $F_{L1}, F_{L2}, F_{L3}, F_E$, by six AND units UE, as illustrated. The outputs of the six AND units UE are respectively ORed again, for example by way of an OR unit OE. An output-side arc fault identification signal SLES or SLB is output at the OR unit.

Figure 5:
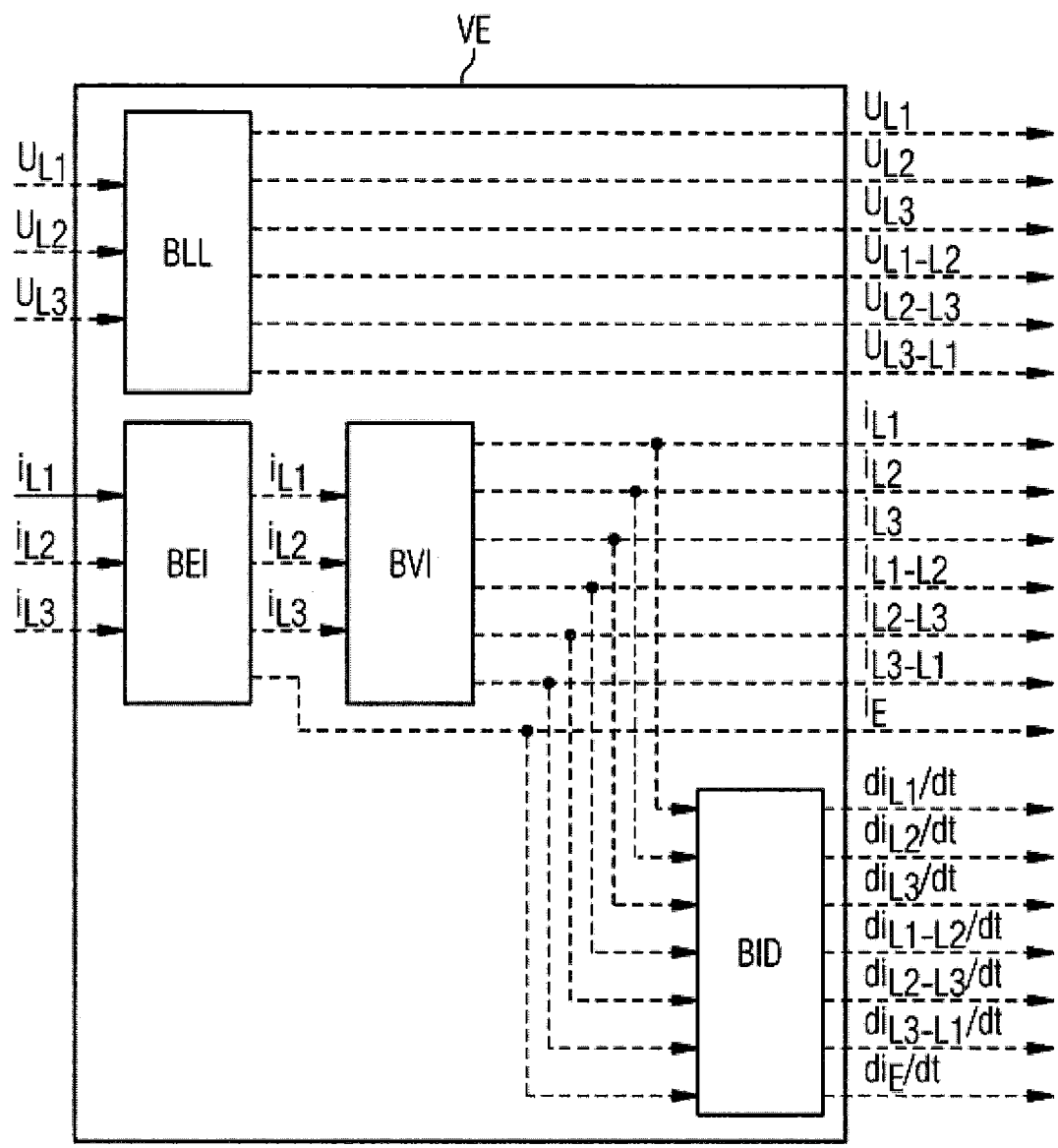
FIG. 5 shows a first illustration for elucidating an embodiment of the invention.

FIG. 5 shows a processing unit VE such as can be provided for an arc fault identification unit SEE.

The phase-neutral conductor voltages are fed thereto, and it determines the phase-phase voltages therefrom via a calculation unit BLL and outputs them.

Furthermore, the phase currents are fed, from which the ground current is determined via a calculation unit BEI. Furthermore, the concatenated current is determined via a calculation unit BVI. A calculation unit BID determines the change in the current with respect to time both for the phase currents and for the concatenated currents. The current variables determined are output at the output of the processing unit VE.

Figure 6:
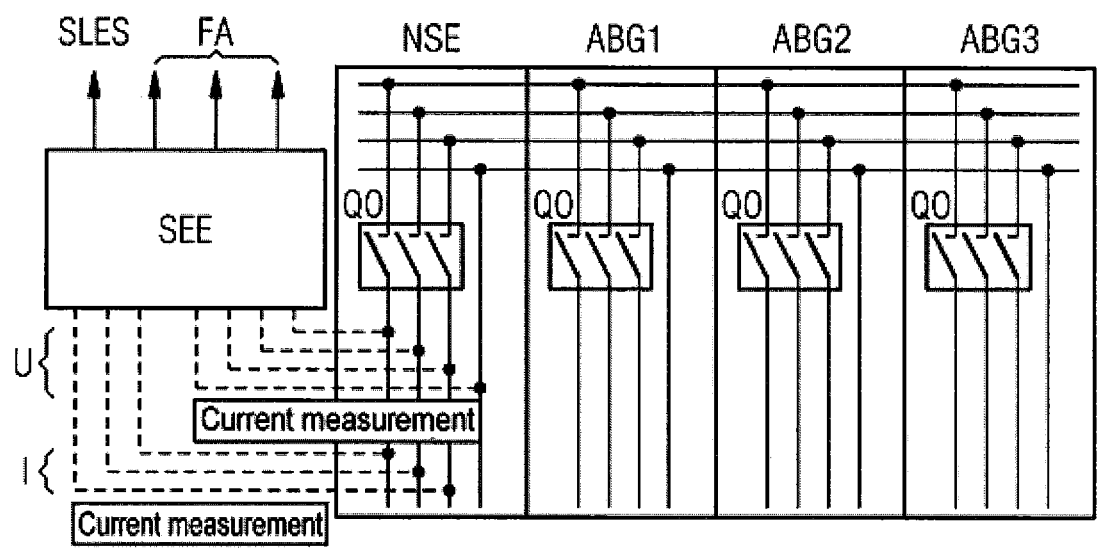
FIG. 6 shows a first illustration for elucidating the use of an embodiment of the invention.

FIG. 6 shows one example of a low-voltage infeed NSE comprising a plurality of outgoers ABG1, ABG2, ABG3. In the low-voltage infeed NSE, voltage values U and current values I are determined or measured, which are fed to an arc fault identification unit SEE according to an embodiment of the invention. The latter outputs an output-side arc fault identification signal SLES in the case of arc faults. Further outputs FA can be provided.

The arc fault identification unit need not be realized as a closed assembly, but rather can be constructed in a decentralized manner. By way of example, it can be realized by a microprocessor that carries out the evaluations according to an embodiment of the invention.

Furthermore, the outputting of an arc fault identification signal can take place only if corresponding evaluation values or/and the current criterion exceed(s) the corresponding threshold value at least twice. Analogously, exceedance of the threshold value three times, four times, five times, etc. can also lead to the outputting of an arc fault identification signal. Particularly reliable evaluation and identification of an arc fault are thus achieved.

Figure 7:
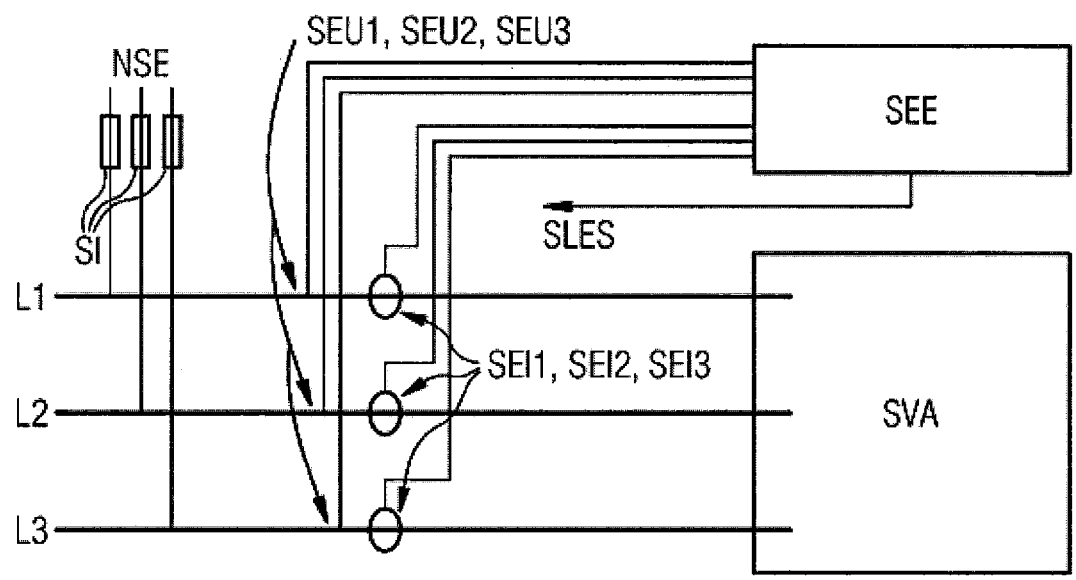
FIG. 7 shows a second illustration for elucidating the use of an embodiment of the invention.

FIG. 7 shows a schematic illustration of an overview circuit diagram for an installation configuration with an outgoer-selective arc fault identification unit for the detection of arc faults. FIG. 7 shows a low-voltage infeed NSE, with fuses SI, which are followed by busbars L1, L2, L3 for the conductors of a three-phase AC grid or circuit. The neutral conductor is not illustrated. Each of the three busbars L1, L2, L3 is assigned a respective voltage sensor SEU1, SEU2, SEU3 and a respective current sensor SEI1, SEI2, SEI3. The busbars are connected to a switching or/and distribution installation SVA.

The voltage and current sensors are connected to an arc fault identification unit SEE according to an embodiment of the invention, which comprises an evaluation unit AE according to an embodiment of the invention. The latter comprises an output for outputting an arc fault identification signal SLES.

The voltage and current sensors determine voltage values and current variables (current value or/and current value change) of the busbars L1, L2, L3 and feed them to the arc fault identification unit SEE according to an embodiment of the invention.

The sensors in this case are arranged outside the arc fault identification unit and are connected thereto.

Figure 8:
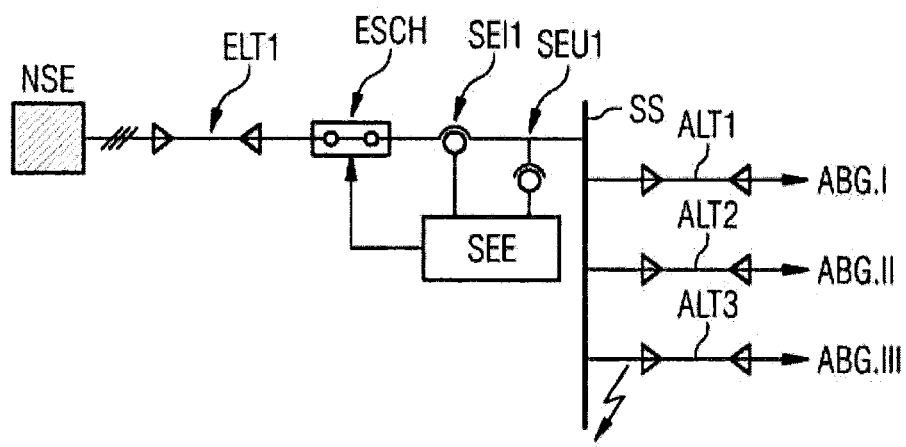
FIG. 8 shows a third illustration for elucidating the use of an embodiment of the invention.

FIG. 8 shows a further schematic illustration of an overview circuit diagram for an installation configuration with a central arc fault identification unit for the detection of arc faults. FIG. 8 shows a low-voltage infeed NSE, which is followed by an infeed cable ELT1, which is followed by an infeed switch ESCH, which is followed by a current sensor SEI1 and a voltage sensor SEU1, which is followed by a busbar SS. Three outgoers ABG I, ABG II and ABG III are provided on the busbar SS. A respective outgoer cable ALT1, ALT2, ALT3 is assigned to the outgoers.

The sensors SEI1, SEU1 are connected to an arc fault identification unit SEE, the output of which is in turn connected to the infeed switch ESCH. The infeed switch can in this case be a circuit breaker. Upon identification of an arc fault, the electrical circuit, i.e. the power supply of the busbar SS, can be interrupted if an arc fault occurs for example in one of the outgoers.

Figure 9:
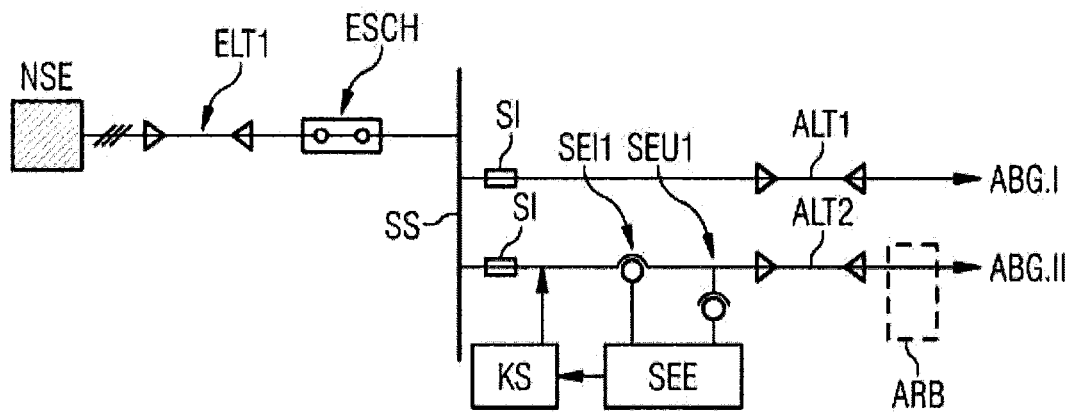
FIG. 9 shows a fourth illustration for elucidating the use of an embodiment of the invention.

FIG. 9 shows an illustration in accordance with FIG. 8, with the difference that the sensors are arranged in the second outgoer ABG II, which additionally has fuses SI and a short-circuiter KS. The sensors SEI1 and SEU1 detect current and voltage values of the outgoer ABG II and forward the values to the arc fault identification unit SEE. If the arc fault identification unit SEE identifies an arc fault, an arc fault identification signal SLES is output at its output and is transmitted to the short-circuiter KS. The latter thereupon short-circuits the outgoer ABG II in order to quench the arc fault.

The arc fault identification in accordance with FIG. 8 or 9 can be embodied for example as a mobile system.

Although the invention has been more specifically illustrated and described in detail by way of the example embodiment, nevertheless the invention is not restricted by the examples disclosed and other variations can be derived therefrom by the person skilled in the art, without departing from the scope of protection of the invention.

The invention claimed is:

1. An arc fault identification unit for an electrical three-phase alternating current circuit having three phase conductors and a neutral conductor, comprising:

voltage sensors, each of the respective voltage sensors being assigned to each of a respective phase conductor of the three phase conductors, to periodically determine phase-neutral conductor voltage values and phase-phase voltage values;

current sensors, each of the respective current sensors being assigned to each of a respective phase conductor of the three phase conductors, to periodically determine phase conductor current variables usable to determine phase conductor current values and a value for a change in electrical current with respect to time; and an evaluation unit, connected to the voltage sensors and connected to the current sensors, and configured to, from the phase conductor current values periodically determined from periodically determined phase conductor current variables, determine current differences of two phase conductors as concatenated currents and configured to, from values for a change in the electrical current with respect to time per phase, determine change differences of two phase conductors as concatenated change current values, the evaluation unit being further configured to:
to determine a ground current from the phase conductor current values,
to determine a respective current root-mean-square value for each of the phase conductor current values and for a ground current, to compare the respective current root-mean-square value, for each of the phase conductor current values and for a ground current, with a first, second, third and fourth current threshold value, to respectively output a first, second, third or fourth overcurrent signal upon the comparing indicating that a respective first, second, third or fourth current threshold value is exceeded, to calculate a first arc voltage from the phase-neutral conductor voltage values, to calculate a second arc voltage from the phase-phase voltage values, to calculate a third arc voltage from the phase current values, to calculate a fourth arc voltage from the concatenated currents, to calculate a fifth arc voltage from values for a change in electrical current with respect to time, to calculate a sixth arc voltage from the concatenated change current values per phase-neutral conductor and per phase-phase to respectively compare first arc voltage, second arc voltage, third arc voltage, fourth arc voltage, fifth arc voltage and sixth arc voltage to a sixth threshold value, and to respectively output a first to sixth arc fault identification signal based upon the respective comparisons, to respectively calculate a seventh arc voltage, an eighth arc voltage, a ninth arc voltage, a tenth arc voltage, an eleventh arc voltage, and a twelfth arc voltage from the phase-neutral conductor voltage values and phase-phase voltage values, to respectively compare the seventh to twelfth arc voltages to seventh to twelfth threshold values, such that a respective seventh to twelfth arc fault identification signal is output upon a respective one of the seventh to twelfth arc voltages exceeding a respective one of the seventh to twelfth threshold values; and to output an output-side arc fault identification signal upon at least one overcurrent signal and one arc fault identification signal being present.

2. The arc fault identification unit of claim 1, wherein at least one of the current to be measured and the current variables determined is filtered by a low-pass filter, such that instead of the phase conductor current values and values for the change in the electrical current with respect to time, filtered phase conductor current values and filtered values for the change in the electrical current with respect to time are present, the filtered phase conductor current values and filtered values for the change in the electrical current with respect to time being used at least for part of the calculation.

3. The arc fault identification unit of claim 2, wherein in that the low-pass filter has a cut-off frequency in the range of 50 hertz to 10 000 hertz.

4. The arc fault identification unit of claim 3, wherein in that the low-pass filter has a cut-off frequency in the range of 50 hertz to 1000 hertz.

5. The arc fault identification unit of claim 4, wherein in that the low-pass filter has a cut-off frequency of 300 hertz.

6. The arc fault identification unit of claim 3, wherein the low-pass filter is a filter in the 1st to 6th order range.

7. The arc fault identification unit of claim 2, wherein the low-pass filter is a filter in the 1st to 6th order range.

8. The arc fault identification unit of claim 2, wherein the filtered phase conductor current values and filtered values for the change in the electrical current with respect to time are used for the calculation of the current root-mean-square values.

9. A circuit breaker for an electrical low-voltage circuit, comprising the arc fault identification unit of claim 2, connected to the circuit breaker and configured such that, upon an output-side arc fault identification signal being output, the circuit breaker trips to interrupt the electrical circuit.

10. A short-circuiter, comprising:
the arc fault identification unit of claim 2, connected to the short-circuiter, configured such that upon an output-side arc fault identification signal, the short-circuiter short-circuits the electrical circuit to cause the arc fault to be quenched.

11. The arc fault identification unit of claim 1, wherein an output-side arc fault identification signal is output upon at least one overcurrent signal and one arc fault identification signal of a same phase-neutral conductor or phase-phase basis being present.

12. The arc fault identification unit of claim 1, wherein from respective ones of the phase-neutral conductor voltage values and phase-phase voltage values, a respective seventh to twelfth arc voltage is calculated such that per phase-neutral conductor and phase-phase voltage values:

a first half of a first number of voltage values is continuously summed to form a first subtotal and a second half of voltage values is continuously summed to form a second subtotal, a respective seventh to twelfth difference between the first subtotal and the second subtotal is determined, and wherein, upon the respective seventh to twelfth differences exceeding the respective seventh to twelfth threshold values in magnitude, a respective seventh to twelfth arc fault identification signal is output.

13. The arc fault identification unit of claim 12, wherein the first number is determined by a time window.

14. The arc fault identification unit of claim 13, wherein a second number of differences is continuously summed to form a difference total, and wherein the difference total is compared with a threshold value and, upon the difference total exceeding the threshold value in magnitude, an arc fault identification signal is output.

15. The arc fault identification unit of claim 12, wherein a second number of differences is continuously summed to form a difference total, and wherein the difference total is compared with a threshold value and, upon the difference total exceeding the threshold value in magnitude, an arc fault identification signal is output.

16. The arc fault identification unit of claim 1, wherein from a respective one of the phase-neutral conductor voltage values, phase-phase voltage values, phase conductor current values, concatenated currents, values for the change in the electrical current with respect to time and concatenated change current values per phase-neutral conductor and per phase-phase, a respective one of the first arc voltage, second arc voltage, third arc voltage, fourth arc voltage, fifth arc voltage and sixth arc voltage is implemented by an integral equation or by a solution of the integral equation.

17. The arc fault identification unit of claim 1, wherein the voltage values and current variables are determined with a multiple of the frequency of the low-voltage circuit or with a sampling frequency in the range of 1-200 kHz.

18. The arc fault identification unit of claim 1, wherein the three-phase alternating current circuit is a low-voltage circuit.

19. A circuit breaker for an electrical low-voltage circuit, comprising the arc fault identification unit of claim 1, connected to the circuit breaker and configured such that, upon an output-side arc fault identification signal being output, the circuit breaker trips to interrupt the electrical circuit.

20. A short-circuiter, comprising:
the arc fault identification unit of claim 1, connected to the short-circuiter, configured such that upon an output-side arc fault identification signal, the short-circuiter short-circuits the electrical circuit to cause the arc fault to be quenched.

21. A method for arc fault identification for an electrical three-phase alternating current circuit including three phase conductors and a neutral conductor, comprising:
periodically determining electrical voltage values and current variables per phase conductor, including:
periodically determining phase-neutral conductor voltage values and phase-phase voltage values,
periodically determining phase conductor current values and values for a change in electrical current with respect to time per phase,
periodically determining, from respective phase conductor current values, respective current differences of two phase conductors as concatenated currents and periodically determining, from respective values for the change in the electrical current with respect to time per phase, respective change differences of two phase conductors as concatenated change current values,
determining a ground current from the phase conductor current values,
determining respective current root-mean-square values for each respective phase current value and the ground current,
comparing respective current root-mean-square values to one of a respective first current threshold value, second current threshold value, third current threshold value and fourth current threshold value,
outputting a respective first overcurrent signal, second overcurrent signal, third overcurrent signal or fourth overcurrent signal upon a respective one of the first current threshold value, the second current threshold value, the third current threshold value and the fourth current threshold value current threshold value being exceeded,
calculating, from a respective one of the phase-neutral conductor voltage values, phase-phase voltage values, phase conductor current values, concatenated currents, values for the change in the electrical current with respect to time and concatenated change current values per phase-neutral conductor and per phase-phase, a respective one of a first arc voltage, a second arc voltage, a third arc voltage, a fourth arc voltage, a fifth arc voltage and a sixth arc voltage,
comparing the respective first arc voltage, a second arc voltage, a third arc voltage, a fourth arc voltage, a fifth arc voltage and a sixth arc voltage to the respective first threshold value, second threshold value, third threshold value, fourth threshold value, fifth threshold value and sixth threshold values, to output a respective first to sixth arc fault identification signal upon a respective threshold value being exceeded,
calculating, from respective phase-neutral conductor voltage values and phase-phase voltage values, a respective seventh to twelfth arc voltage, and
comparing the respective seventh to twelfth arc voltage to respective seventh to twelfth threshold values, to output a respective seventh to twelfth arc fault identification signal upon a respective threshold value being exceeded, wherein
an output-side arc fault identification signal is output upon at least one overcurrent signal and one arc fault identification signal are being present.

* * * * *